US012450673B2

United States Patent
Woelfer et al.

(10) Patent No.: US 12,450,673 B2
(45) Date of Patent: Oct. 21, 2025

(54) METHOD AND SYSTEM FOR EFFICIENT DISPUTE RESOLUTION

(71) Applicant: Visa International Service Association, San Francisco, CA (US)

(72) Inventors: Mark Woelfer, Aliso Viejo, CA (US); Richard Stopic, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 726 days.

(21) Appl. No.: 16/512,977

(22) Filed: Jul. 16, 2019

(65) Prior Publication Data

US 2020/0118230 A1 Apr. 16, 2020

Related U.S. Application Data

(60) Provisional application No. 62/745,252, filed on Oct. 12, 2018.

(51) Int. Cl.
  *G06Q 50/18* (2012.01)
  *G06Q 20/04* (2012.01)
  *G06Q 20/38* (2012.01)

(52) U.S. Cl.
  CPC ......... *G06Q 50/182* (2013.01); *G06Q 20/047* (2020.05); *G06Q 20/388* (2013.01)

(58) Field of Classification Search
  None
  See application file for complete search history.

(56) References Cited

U.S. PATENT DOCUMENTS

| 7,356,516 B2 | 4/2008 | Richey et al. |
| 8,392,288 B1 | 3/2013 | Miller |
| 8,566,235 B2 | 10/2013 | Katz et al. |

(Continued)

FOREIGN PATENT DOCUMENTS

KR  20140029696  3/2014

OTHER PUBLICATIONS

U.S. Appl. No. 14/814,188 , "Notice of Allowance", Oct. 16, 2019, 8 pages.

(Continued)

*Primary Examiner* — Scott S Trotter
(74) *Attorney, Agent, or Firm* — Kilpatrick Townsend & Stockton LLP

(57) ABSTRACT

Described herein are systems and techniques for reducing the submission of disputes as well as increasing the efficiency of disputes processed via a dispute resolution process. The system enables additional information related to a conducted transaction to be provided via application programming interface calls made to a resource provider. In some embodiments, the system described receives a dispute request from client computing device pertaining to a conducted transaction, the dispute request including a transaction identifier associated with the conducted transaction, determines a resource provider associated with the conducted transaction, provides, to the resource provider, an alert notification indicating the dispute request, the alert notification including at least the transaction identifier, and receives, from the resource provider within the predetermined period of time, a credit notification for the conducted transaction.

6 Claims, 12 Drawing Sheets

(56) References Cited

U.S. PATENT DOCUMENTS

| | | | |
|---|---|---|---|
| 8,612,317 | B1 | 12/2013 | Harman et al. |
| 8,682,793 | B2 | 3/2014 | Carlson et al. |
| 8,880,431 | B2 | 11/2014 | Ovick et al. |
| 9,875,385 | B1 | 1/2018 | Humphreys |
| 2002/0141561 | A1 | 10/2002 | Duncan et al. |
| 2004/0064373 | A1 | 4/2004 | Shannon |
| 2004/0128155 | A1 | 7/2004 | Vaidyanathan et al. |
| 2004/0220964 | A1 | 11/2004 | Shiftan et al. |
| 2005/0177507 | A1* | 8/2005 | Bandych ............. G06Q 20/10 705/40 |
| 2005/0178824 | A1 | 8/2005 | Benson et al. |
| 2007/0094088 | A1 | 4/2007 | Mastie et al. |
| 2009/0030710 | A1 | 1/2009 | Levine |
| 2010/0145810 | A1 | 6/2010 | Pourfallah et al. |
| 2010/0161457 | A1 | 6/2010 | Katz et al. |
| 2010/0169194 | A1* | 7/2010 | Richey ............. G06Q 30/016 705/309 |
| 2010/0257066 | A1 | 10/2010 | Jones et al. |
| 2011/0196791 | A1 | 8/2011 | Dominguez |
| 2011/0276475 | A1 | 11/2011 | Godejohn et al. |
| 2012/0084391 | A1 | 4/2012 | Patel et al. |
| 2012/0284175 | A1 | 11/2012 | Wilson et al. |
| 2013/0080318 | A1 | 3/2013 | Katz et al. |
| 2013/0132231 | A1 | 5/2013 | Teudt |
| 2013/0218721 | A1 | 8/2013 | Borhan et al. |
| 2014/0074675 | A1 | 3/2014 | Calman et al. |
| 2014/0074690 | A1 | 3/2014 | Grossman et al. |
| 2014/0180826 | A1 | 6/2014 | Boal |
| 2014/0195361 | A1 | 7/2014 | Murphy |
| 2014/0236714 | A1 | 8/2014 | Fukasawa et al. |
| 2014/0244462 | A1 | 8/2014 | Maenpaa et al. |
| 2014/0310160 | A1 | 10/2014 | Kumar et al. |
| 2015/0012397 | A1 | 1/2015 | Gotanda et al. |
| 2015/0012426 | A1 | 1/2015 | Purves et al. |
| 2015/0186888 | A1 | 7/2015 | Katz et al. |
| 2015/0332415 | A1 | 11/2015 | Johansen et al. |
| 2015/0356522 | A1 | 12/2015 | Matsumoto |
| 2015/0356541 | A1 | 12/2015 | Hasegawa |
| 2016/0034906 | A1 | 2/2016 | Stopic et al. |
| 2016/0155203 | A1 | 6/2016 | Gotanda |
| 2016/0292677 | A1 | 10/2016 | Karlsson |
| 2016/0300214 | A1* | 10/2016 | Chaffin ............. G06Q 20/02 |
| 2017/0300881 | A1 | 10/2017 | Weinflash et al. |
| 2020/0202309 | A1 | 6/2020 | Whitelaw |

OTHER PUBLICATIONS

PCT/US2018/032428, "International Search Report and Written Opinion", Sep. 17, 2018, 11 pages.
PCT/US2018/032428, "International Preliminary Report on Patentability", Nov. 21, 2019, 8 pages.
EP18798207.9, "Extended European Search Report", Apr. 8, 2020, 8 pages.
U.S. Appl. No. 16/609,181, "U.S. Non-Final Office Action", Aug. 19, 2021, 24 pages.
U.S. Appl. No. 14/814,188, "Final Office Action", Apr. 18, 2019, 11 pages.
U.S. Appl. No. 14/814,188, "Non-Final Office Action", Sep. 20, 2018, 12 pages.
U.S. Appl. No. 14/814,188, "Non-Final Office Action", Feb. 8, 2018, 13 pages.
U.S. Appl. No. 14/814,188, "Restriction Requirement", Nov. 16, 2017, 6 pages.
U.S. Appl. No. 16/609,181, Final Office Action, Mailed on Feb. 28, 2022, 18 pages.
U.S. Appl. No. 14/814,188, "Advisory Action", Jul. 18, 2019, 3 pages.
U.S. Appl. No. 16/609,181, "Non-Final Office Action", Jun. 17, 2022, 19 pages.
U.S. Appl. No. 16/609,181, Final Office Action, Mailed on Oct. 13, 2022, 19 pages.
U.S. Appl. No. 16/609,181, Non-Final Office Action, Mailed on Jan. 30, 2025, 20 pages.

* cited by examiner

METHOD AND SYSTEM FOR EFFICIENT DISPUTE RESOLUTION

CROSS-REFERENCE TO RELATED APPLICATIONS

This international application claims priority to U.S. Patent Application No. 62/745,252, filed on Oct. 12, 2018, the disclosure of which is herein incorporated by reference in its entirety for all purposes.

BACKGROUND

Most, if not all banks, issuing entities, or authorizing entities provide a statement to their customers. Such statements include information on the different transactions that the customer has participated in, the amount of money that the customer has spent, and the name of any resource providers participating in the transaction. Increasingly, banks have moved from monthly statements to digital statements, which can be accessed by a customer at any time via a computer or mobile device.

Many customers appreciate digital statements, as they provide a convenient way to check for fraudulent or incorrect transactions. However, often the statement does not provide enough information for the customer to verify the accuracy of the transactions listed on the statement. Frequently a customer is left pondering whether or not a particular transaction is fraudulent or legitimate. This, in turn, results in a high number of dispute requests being submitted to an issuer, in which the customer, unable to recognize the transaction, disputes that he or she conducted that transaction. In 2016, close to 3 million disputes were due to a cardholder not recognizing a transaction. In conventional systems, merchants and consumers collectively spend an inordinate amount of time verifying transactions via dispute requests.

In addition, storage of sufficient transaction details (e.g., digital receipts) is difficult and may not be practical in many instances. For example, conventional receipt storages systems can store receipts in databases. Merchants may store their receipts, but they are of limited value to consumers, because consumers purchase goods from more than one merchant. Users can load their own receipts into their own transaction database. However, this requires the user to remember to upload receipts. This is not only time consuming, but it can be impractical given the number of merchants that a typical consumer interacts with.

Furthermore, in order to process a dispute in a conventional system, a dispute request is sent to an acquirer associated with a resource provider involved in the dispute. The acquirer then charges that resource provider a processing fee even if the resource provider was willing to refund the transaction in the first place. In these conventional systems, the resource provider is not given the opportunity to (and the system lacks the means to) prevent the dispute from making its way to the acquirer. This means that if the resource provider loses a dispute for a particular transaction, that resource provider will wind up refunding the transaction amount, losing any merchandise that was the subject of the transaction, and on top of that paying a processing fee.

Embodiments of the disclosure address these and other problems, individually and collectively.

SUMMARY

Embodiments of the disclosure are directed to a system and techniques for reducing and/or preventing disputes from being processed.

One embodiment of the disclosure is directed to a method performed by a processing server of providing information associated with a transaction, comprising receiving a request from a client computing device pertaining to a transaction conducted at a resource provider, the request including a number of data elements, determining, based on the resource provider, one or more sources at which information associated with each of the data elements for the transaction is stored, providing, to each of the determined one or more sources, a request for data values corresponding to the data elements stored at the respective source, upon receiving responses from each of the one or more sources, compiling the data values from the responses into a digital receipt element, and providing the digital receipt element to the authorization provider.

Another embodiment of the disclosure is directed to a processing server comprising: a processor; and a memory including instructions that, when executed with the processor, cause the processing server to, at least receive a request from a client computing device pertaining to a transaction conducted at a resource provider, the request including a number of data elements, determine, based on the resource provider, one or more sources at which information associated with each of the data elements for the transaction is stored, provide, to each of the determined one or more sources, a request for data values corresponding to the data elements stored at the respective source, upon receiving responses from each of the one or more sources, compile the data values from the responses into a digital receipt element, and provide the digital receipt element to the authorization provider.

Another embodiment of the disclosure is directed to a method performed by a process server comprising receiving a dispute request from a client computing device pertaining to a conducted transaction, the dispute request including a transaction identifier associated with the conducted transaction, determining a resource provider associated with the conducted transaction, providing, to the resource provider, an alert notification indicating the dispute request, the alert notification including at least the transaction identifier, upon receiving, from the resource provider within a predetermined period of time, a credit notification, monitoring settlement notices for a credit corresponding to the credit notification, and upon detecting the credit corresponding to the credit notification, providing a response to the authorization provider indicating the credit, and upon failing to receive, from the resource provider within the predetermined period of time, the credit notification, releasing the dispute request to an acquirer associated with the resource provider.

Another embodiment of the disclosure is directed to a processing server comprising: a processor; and a memory including instructions that, when executed with the processor, cause the processing server to, at least: receive a dispute request from a client computing device pertaining to a conducted transaction, the dispute request including a transaction identifier associated with the conducted transaction, determine a resource provider associated with the conducted transaction, provide, to the resource provider, an alert notification indicating the dispute request, the alert notification including at least the transaction identifier, and receive, from the resource provider within the predetermined period of time, a credit notification for the conducted transaction.

These and other embodiments of the disclosure are described in further detail below.

DETAILED DESCRIPTION

Figure 1:
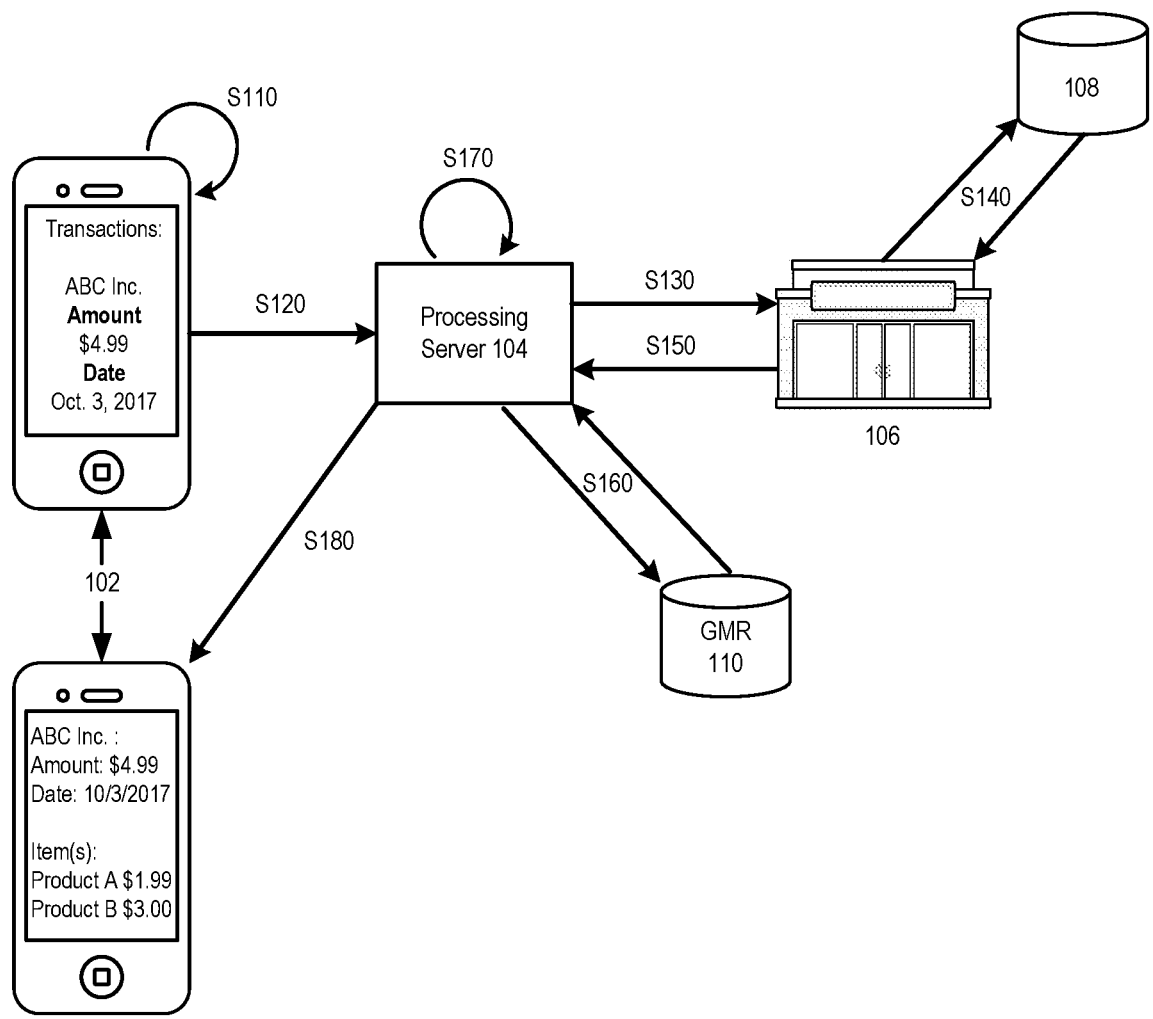
FIG. 1 depicts an example interaction between a user device and the system described herein in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present disclosure, description of some terms may be helpful in understanding the various embodiments.

An "Application Programming Interface" (API) is a set of procedures, protocols, or tools for building software applications. An API may be used to build applications which allow communication between one or more entities. Examples of APIs include POSIX, and the C++ Standard Template Library. An "API call" is a communication between two software applications or computers made possible by an API. An API call could include a standardized method of requesting or delivering information between software applications, such as a client-side application and a server-side application according to the server-side API. An API call could take the form of an HTTP method, such as GET, POST, PUT, or DE. For example, a processing server may implement a first API used to receive transaction data requests from computing devices. The transaction data requests may include one or more transaction elements that the processing server can use to determine a resource provider involved in the transaction. A digital receipt response can include one or more digital receipt elements based on transaction data. The processing server may also implement a second API for requesting transaction data from resource provider servers. The transaction data requests can include the one or more transaction elements. The corresponding transaction data response can include the one or more digital receipt elements.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, resource provider identifier, resource provider location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the transaction processing computer) to the resource provider's access device (e.g., POS equipment) that indicates approval of the transaction. The code may serve as proof of authorization.

An "authorization provider" is an entity which can authorize or approve transactions. An authorization provider may typically refer to a business entity (e.g., a bank) that maintains an account for a user and is capable of authorizing transactions such as payment transactions, for example the purchase of goods or services. An authorization provider may provide a statement of the account to the user listing the transactions on the account. An authorization provider may enable a user to select a transaction on their statement to see a detailed digital receipt. The authorization provider may request the digital receipt from a processing server that provides an API for requesting digital receipts.

A "client computing device" may include any computing device which may be used to submit a request in accordance with embodiments of the disclosure. In some embodiments, a client computing device may be a computing device operated on behalf of an authorization provider. In some embodiments, a client computing device may be a computing device operated on behalf of a user associated with an account maintained by an authorization provider. Some non-limiting examples of a client computing device may include an issuer computer, a user terminal at an issuer, a cardholder's personal communication device, etc.

A "digital receipt" may be an electronic representation of a receipt which could be issued during the course of a transaction between a resource provider and a user. A digital receipt may be based on one or more "digital receipt elements." A digital receipt element may be an image or image data object (e.g., a pdf) of a physical or digital receipt created at the time of the transaction. The digital receipt elements may also include data indicating a list of items along with their prices, a subtotal, total, applicable taxes, authorization, a transaction ID, a transaction date, a transaction time, a posted date, a transaction type, a transaction method, a transaction number, the name of the resource provider, the address of the resource provider, the signature of the user, and/or some or all of the digits of a primary account number, such as the last four digits of a credit card number. Digital receipt elements may further include other information, such as notifications of a sale, advertisements, a bar code, a QR code, coupons, a savings amount, and/or images, indicia associated with the resource provider, resource provider, or a payment processing network such as VisaNet, or a message or statement in text from the resource provider, resource provider, or payment processing network. A digital receipt may be generated based on the one or more digital receipt elements and may be formatted different depending on the available digital receipt elements.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "merchant" may typically be an entity that engages in transactions and can sell goods or services, or provide access to goods or services. A merchant may operate in a physical storefront (e.g., brick and mortar) or they may operate a digital storefront (e.g., a website). A merchant may also sell goods or services through a third party aggregator that offers goods and services from a plurality of merchants. Merchants may provide receipts to customers along with the sale of a good or service. The receipt may be a printed receipt or a digital receipt. Digital receipts may be sent to the customer via email or text message. Merchants may provide detailed digital receipts to an authorization provider of the consumer's account used to conduct the transaction via a processing server.

A "processing server" may be a server computer designed or programmed to process requests made by other entities. This may include requests such as a request for transaction information or a digital receipt. The processing server may be in operative communication with a variety of entities in order to process requests. The processing server may provide an application programming interface (API) for processing requests. For example, a first API may be used to receive transaction data requests from computing devices. The transaction data requests may include one or more transaction elements that the processing server can use to determine a resource provider involved in the transaction. The processing server can determine a resource provider server that provides receipt management services for one or more resource providers. The processing server can then use a second API to send a receipt information request to the resource provider server and can receive, in response, transaction data for the transaction associated with the one or more transaction elements. The processing server can generate one or more digital receipt elements based on the transaction data and provide the one or more digital receipt elements to the authorization provider, for example.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

As used herein, the term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

A "resource" is something that may be used or consumed by an entity or transferred between entities. A resource may also be something that is accessed by an entity. For example, the resource may be an electronic resource (e.g., stored data, received data, a computer account, a financial account, a network-based account, an email inbox), a physical resource (e.g., a tangible object, a building, a safe, or a physical location), or other electronic communications between computers (e.g., a communication signal corresponding to an account for performing a transaction).

A "resource provider" may be an entity that can provide resources. Examples of a resource providers include a merchant website operator, a data storage provider, an internet service provider, a bank, a building owner, a governmental entity, etc.

The term "server computer" may include any suitable computing device that can provide communications to other computing devices and receive communications from other computing devices. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

A "statement" can include a periodic summary of activity with a beginning and an end date. A statement can include a list of transactions conducted on an account provided by an authorization provider (e.g., an issuer). For each transaction, the statement may indicate a date of the transaction, a type of the transaction, a brief description of the transaction, and an amount of the transaction. The statement may be a digital statement provided via a website or a software application.

A "user" can be a person or thing that employs some other thing for some purpose. A user may include an individual that may be associated with one or more personal accounts and/or mobile devices. The user may also be referred to as a cardholder, account holder, or consumer in some embodiments.

A "user device" may comprise any suitable computing device that can be used for communication. A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include desktop computers, videogame consoles, mobile phones (e.g., cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single user device). A user device may be referred to as a computing device.

Messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Details of some embodiments of the present disclosure will now be described in greater detail.

FIG. 1 depicts an example interaction between a user device and the system described herein in accordance with at least some embodiments. In FIG. 1, a user device 102 may be used to interact with a processing server 104. The processing server 104 may be configured to communicate with a number of resource provider entities 106.

User device 102 may be any electronic device capable of performing the functions attributed to it herein. For example, a user device 102 may be configured to present details related to one or more transactions to a user. The details may be received from processing server 104, an authorization provider (e.g., an issuer), or any other entity capable of providing transaction details. In some embodiments, the user device 102 may enable submission of a request for additional transaction details related to a particular transaction. For example, upon selection of a particular transaction via the user device 102, the user device may enable a user to submit a request for additional information via a button displayed on a graphical user interface (GUI). In some embodiments, communication between the user device 102 and the processing server 104 may be enabled via a software application. In some embodiments, the user device 102 may have installed upon it a software application that is maintained by the processing server 104. Transaction details presented on the user device 102 may be obtained via the software application. In some embodiments, the user may be required to log into an account maintained by the processing server 104 (or an authorization provider) in order to gain access to transaction details.

The user device 102 may be operated by a consumer that interacted with the resource provider 106, or the user device 102 may be operated by a user (e.g., an employee) of an authorization provider such as a bank. In the latter case, the user at the authorizing provider may have received an inquiry from a consumer that conducted a transaction with the resource provider 106.

Processing server 104 may be any electronic device capable of performing the functions attributed to it herein. For example, the processing server 104 may be a computing device capable of receiving requests for additional transaction details from a user device 102 (or authorization provider) and obtaining the requested additional details. In some embodiments, a request for additional transaction details may be received from an authorization provider instead of from a user device 102. For example, a request submitted via a user device 102 may be submitted to an authorization provider. In this example, the request may then be forwarded by the authorization provider to the processing service 104. In some embodiments, the processing server 104 may be configured to identify a resource provider 106 associated with the request, determine one or more capabilities of the resource provider 106, and format a request to that resource provider 106 in accordance with the determined capabilities.

Resource provider 106 may be any entity that manages access to one or more resources (e.g., products and/or services). The resource provider 106 may operate a resource provider computer, which is capable of completing transactions on behalf of the resource provider 106. The resource provider computer may be configured to, upon receiving a request for transaction details related to a particular transaction, query a database 108 of transaction data for the requested transaction details. In some embodiments, the database 108 may store digital documents such as digital receipts. In some embodiments, the database 108 may store a digital representation of a user's signature or other authentication. In other embodiments, the database 108 may also store information regarding the resource provider 106, such as the resource provider's name, address, a picture of the resource provider 106, etc.

By way of illustrating an example interaction between various components as depicted in FIG. 1, an example process is described as follows. In this process, a user may, in relation to a particular transaction, request transaction details at step S110 of the process. For example, a user may view some high-level details of the transaction on the user device 102. Upon viewing those high-level details, the user may wish to obtain low-level details of the transaction. In this example process, the high-level transaction details for the transaction may be provided to the user device 102 by an authorization provider which does not have immediate access to the low-level details for the transaction (e.g., because of data storage constraints). For example, the high-level details may be initially provided via a digital account statement. In some embodiments, the request for transaction details may be submitted in the form of a transaction dispute.

At step S120 of the process, the user device 102 may transmit the request for low-level details to a processing server 104. In some embodiments, the request may be transmitted over the Internet or some other network of computing devices. In some embodiments, the request may be submitted to the processing server 104 via a communication session opened between the user device 102 and the processing server 104. For example, the request may be submitted via a software application installed, and executed, upon the user device 102 which causes the user device 1902 to establish a communication session with the processing server 104.

In some embodiments, the request may include information such as a transaction identifier (ID), and/or other transaction identifying information such as a transaction amount, date and time of transaction, resource provider identifier, and/or a user identifier (e.g., a primary account number). The request may also specify the type of information requested. For example, the request may specify, with an assigned code, that the requested information includes a requested image of a receipt used to conduct the transaction in question, or a location and "dba" or doing business as name of the resource provider 106.

Upon receiving the request for additional information such as transaction details from the user device 102, the processing server 104 may identify a resource provider associated with the request. Once the resource provider has been identified, the processing server 104 may, in some cases, determine what types of transaction data are maintained by that resource provider 106 and/or what format requests to that resource provider 106 should be in. The processing server 104 may then generate (in a proper format) a request for the requested information, which is transmitted to the resource provider 106 at step S130.

The resource provider 106 may, upon receiving the request for additional data, choose whether or not to respond to the request. If the resource provider 106 determines that a response is appropriate, then the resource provider 106 may query a data store 108 which it maintains for the requested additional information (e.g., transaction details) at step S140. In some embodiments, if the request for additional information (e.g., transaction details) is for a dispute of the transaction, the resource provider may elect to reimburse some portion of the funds charged in the transaction. In some cases, this may be done if the resource provider 106 determines that it does not have the requested transaction details. For example, the resource provider 106 may receive a dispute for a transaction in which it is requested that the resource provider provide a digital copy of the customer's signature. Upon receiving this request, the resource provider 106 may determine that the resource provider 106 does not have a digital copy of the customer's signature. Upon making this determination, the resource provider 106 may further determine that the transaction should be canceled. In this example, the resource provider may elect to credit the charged account and may provide, in response to the request, an indication that the account will be credited.

At step S150, the resource provider 106 may provide some portion of the requested transaction details, or a reference to a location at which those transaction details are located, to the processing server.

In some embodiments, the processing server 104 may retrieve at least a portion of the requested transaction details from a separate data store at step S160. The resource provider 106 (as well as other resource providers) may store transaction details within a data store which is maintained by either the processing server 104 or a separate entity. For example, the resource provider 106 may store transaction details within a global merchant repository (GMR) 110. In the response sent at step S150, the resource provider 106 may provide a reference to a location (e.g., a reference to a database entry) within the GMR 110 and the processing server 104 may retrieve the transaction details from that location. In some embodiments, the processing server 104 may obtain a first portion of the requested transaction details from the resource provider 106 and may obtain a second portion of the transaction details from the GMR 110. In some embodiments, GMR 110 may include additional data related to one or more resource providers which is obtained from a third-party entity (i.e., an entity unaffiliated with either the processing server or the resource provider). In some embodiments, the GMR 110 may include additional data received via authorization requests and/or responses submitted over a transaction processing network. At step S160, transaction data received from the resource provider 106 may be supplemented with additional data stored in the GMR 110.

After obtaining the requested transaction details, the processing server 104 may verify the message received at step S150 and (upon verification) forward the received transaction details to the authorization provider (e.g., issuer). In some embodiments, the message received at step S150 may be verified using a digital signature provided by the resource provider 106. For example, the processing server 104 may perform a cryptographic function on the digital signature using a public key associated with the resource provider and compare the result to an expected result. In some embodiments, the message received from the resource provider 106 at step S150 may be verified by virtue of having been transmitted over a secure connection between the processing server 104 and the resource provider 106.

At step S180, at least a portion of the transaction details obtained by the processing server 104 may be provided to the user device 102. In some embodiments, the transaction details may be presented on a display of the user device 102 upon being received. In some embodiments, the user device 102 may, upon presenting the transaction details, provide an option to dispute, or continue with a dispute of, the transaction. In at least a portion of these embodiments, the option to dispute the transaction may not be presented until the user device has presented the additional transaction details.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the internet), using any suitable communication protocol.

Figure 2:
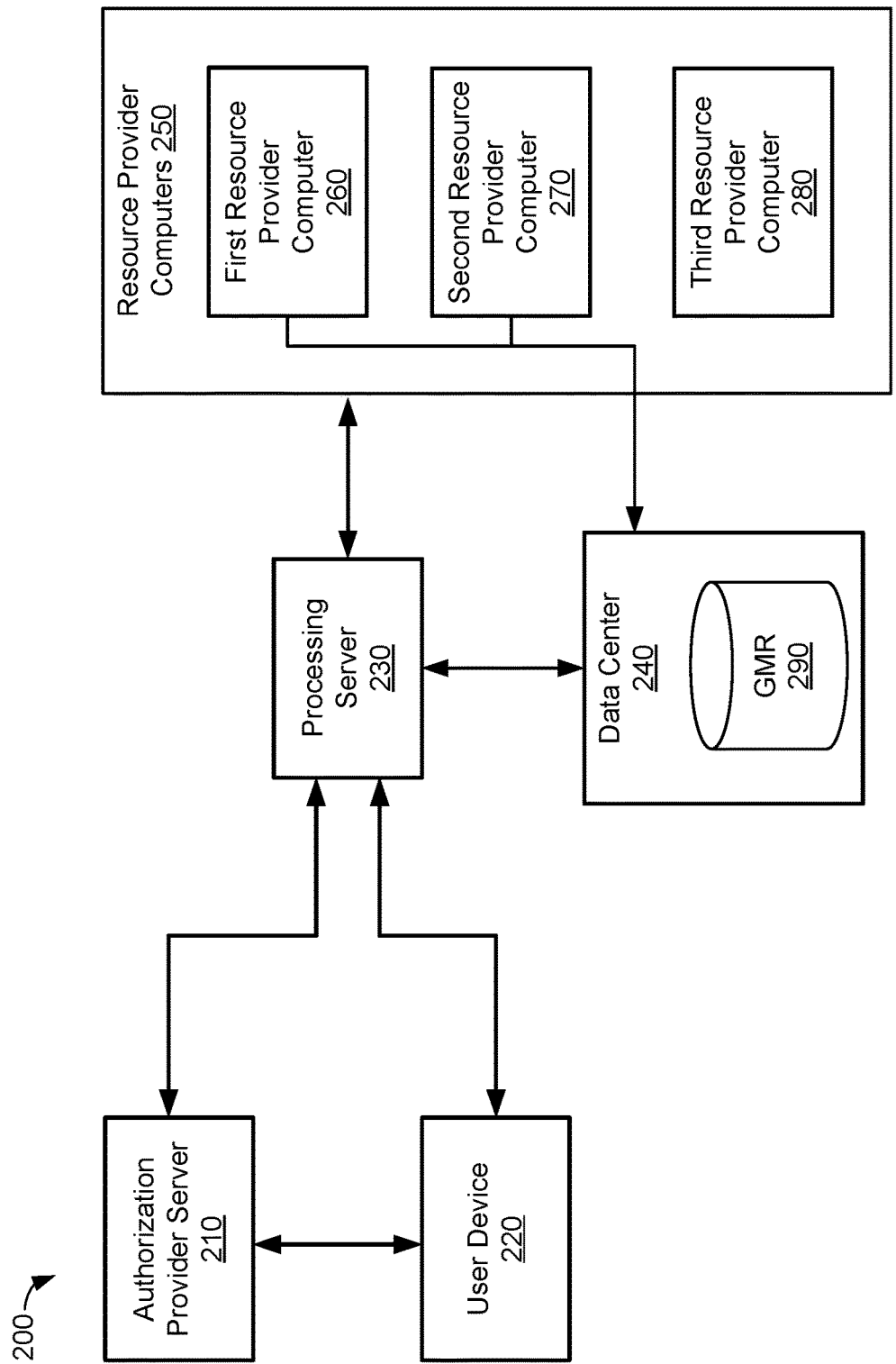
FIG. 2 depicts a block diagram of a transaction data provider and rapid dispute resolution system, according to an embodiment of the invention.

FIG. 2 depicts a block diagram of a transaction data provider and rapid dispute resolution system 200, according to an embodiment of the invention. The rapid dispute resolution system 200 may include at least one authorization provider 210, a user device 220, a processing server 230, a data center 240 (which may include a global merchant repository 290), and a number of resource provider computers 250 (depicted as including a first resource provider computer 260, a second resource provider computer 270, and a third resource provider computer 280). Each of these entities may be capable of communicating over one or more communications network. For example, a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the entities, providers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

In some non-limiting examples, the user device 220, which may be operated by a user, may be a mobile phone, tablet, laptop computer, or desktop computer. The user device 220 is capable of running software, such as a web browser and a digital wallet application capable of providing digital statements.

The authorization provider server 210 is capable of authorizing transactions for accounts which it maintains. The authorization provider 210 computer can communicate with the user device 220 to provide a digital account statement to the user of the user device 220 via a hosted webpage or a software application. The account statement may include a list of transactions made on an account of the user and a balance due for those transactions. Conventionally, the account statement may include a transaction date, a transaction amount, and a brief description of the merchant. Conventionally, the brief description of the merchant does not provide any specific details about the transaction (e.g., the time of the transaction or the goods or services purchased in the transaction). In some cases, the name of the merchant may not be recognized by the consumer, because the name of the merchant on the account statement may be a corporate name, whereas the consumer knows the merchant by its business name.

The processing server 230 is in communication with the authorization provider 210, the user device 220, the data center 240, and each of the resource provider computers 250. The processing server is capable of providing the transaction details (e.g., data values, an image, document, or file) to the authorization provider 210 or user device 220. In some embodiments, the transaction details may be provided as a digital receipt element. The digital receipt element for a transaction may be generated using transaction details obtained from a resource provider and/or a global merchant repository 290 that manages receipts for a particular resource provider involved in the transaction. In this embodiment, the data center 240, which may be a third-party service provider, maintains transaction and receipt records in a global merchant repository 290 for a first resource provider computer 260 and a second resource provider computer 270. The transaction and receipt records may be sent from the first resource provider computer 260 and the second resource provider computer 270 to the global merchant repository 290 after each transaction or in a batch at predetermined increments. A third resource provider computer 280 is depicted as not using the global merchant repository 290 to maintain transaction and receipts data and instead acts as its own transaction data repository.

The data center 240 is in communication with the processing server 230 and, in some embodiments, a directory server. The data center 240 includes a global merchant repository 290 and may also include a resource provider database. In some embodiments, the global merchant repository 290 (and the resource provider database) may be stored at the processing server 230 and the functionality of the data center 240 may be performed by the processing server 230. The global merchant repository 290 includes transaction information for transactions processed by a payment processing network (not shown). The transaction information stored in the global merchant repository 290 for each transaction can include a billing amount, a transaction amount, a transaction data, a transaction time, a resource provider identifier, an entry mode, "level 3 data" (e.g., flight departure date and city, and flight arrival date and city etc.) and any other details that are included in an authorization request or authorization response message used for authorizing that particular transaction.

In some embodiments, the data center 240 may maintain information associated with numerous resource providers. The information maintained for a particular resource provider can include the resource provider identifier (which is also used for the transaction information in the global merchant repository 290), a store name, a resource provider name, a resource provider legal name, a resource provider category code, a resource provider category description, a resource provider street address, a city, state, postal code, and country code of the location that the resource provider is in, a phone number of the resource provider, and a website address (e.g., URL) of the resource provider.

In some embodiments, the data center 240 can be operated by an acquirer. An acquirer is typically an entity that manages and maintains accounts for a plurality of resource providers (e.g., merchants). Acquirers can house transaction data, as well as resource provider identifiers. It may also receive, periodically, detailed transaction data such as "level 3" data which might include information about the specific goods and services purchased by the users. Independent of embodiments of the invention, such information may be housed by the acquirer for dispute resolution purposes in the event that a consumer that interacted with a merchant of the acquirer wishes to dispute a transaction.

Figure 3:
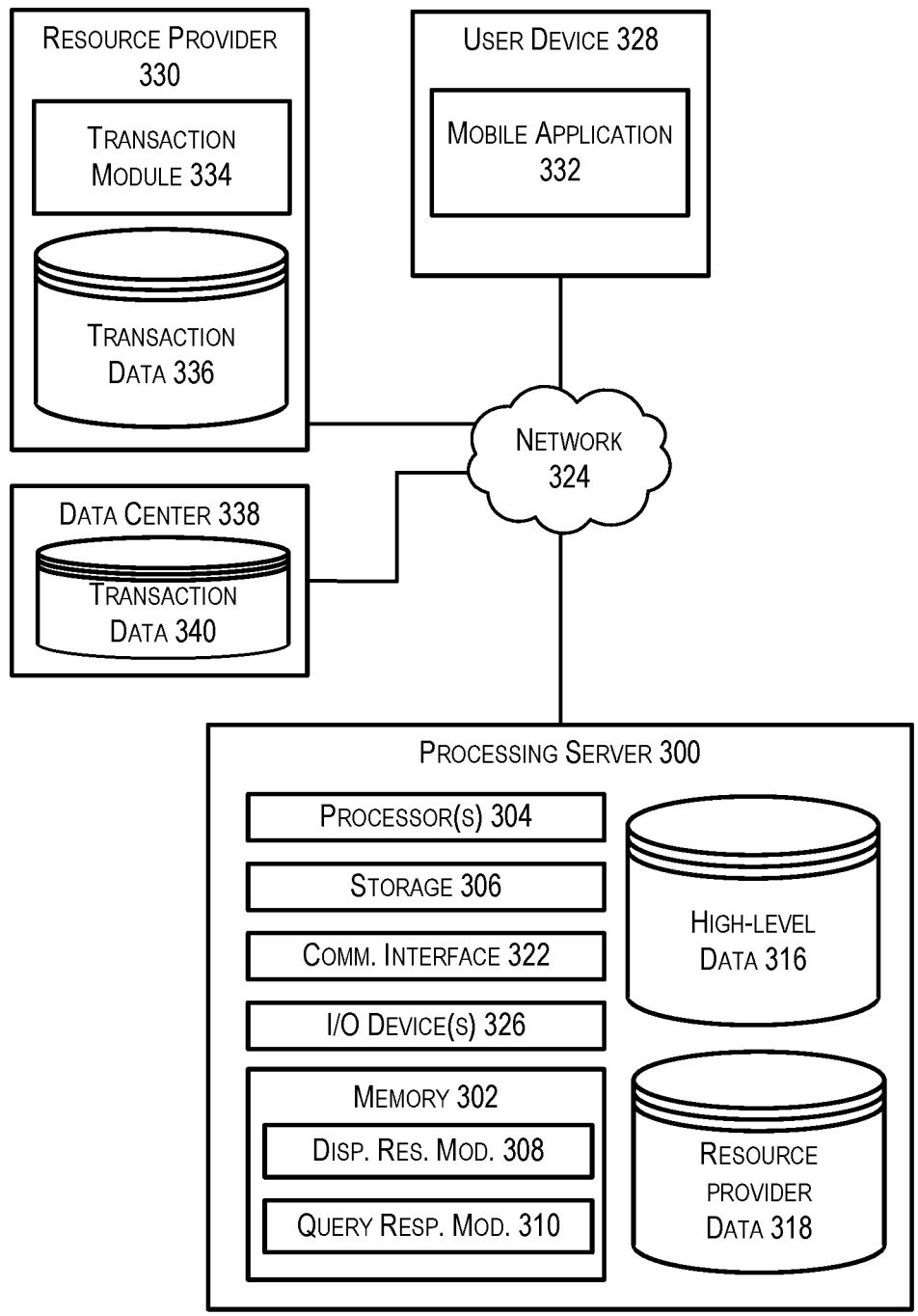
FIG. 3 depicts a diagram of an exemplary processing server 300 that may be configured to provide rapid dispute resolution in accordance with at least some embodiments.

FIG. 3 depicts a diagram of an exemplary processing server 300 that may be configured to provide rapid dispute resolution in accordance with at least some embodiments. The processing server 300 may be an example processing server 104 described with respect to FIG. 1, and is shown with other components that may in a system according to an embodiment.

The processing server 300 may be any type of computing device capable of receiving transaction disputes (or other requests for data) with respect to one or more resource providers and generating a response to be provided to a user device. In at least some embodiments, the processing server 300 may include at least one memory 302 and one or more processing units (or processor(s)) 304. The processor(s) 304 may be implemented as appropriate in hardware, computer-executable instructions, firmware or combinations thereof. Computer-executable instruction or firmware embodiments of the processor(s) 304 may include computer-executable or machine executable instructions written in any suitable programming language to perform the various functions described.

The memory 302 may store program instructions that are loadable and executable on the processor(s) 304, as well as data generated during the execution of these programs. Depending on the configuration and type of processing server 300, the memory 302 may be volatile (such as random access memory (RAM)) and/or non-volatile (such as read-only memory (ROM), flash memory, etc.). The processing server 300 may also include additional storage 306, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the processing server 300. In some embodiments, the memory 302 may include multiple different types of memory, such as static random access memory (SRAM), dynamic random access memory (DRAM) or ROM.

Turning to the contents of the memory 302 in more detail, the memory 302 may include an operating system and one or more application programs or services for implementing the features disclosed herein including at least a module for initiating or blocking dispute resolution (dispute resolution module 308) and a module for responding to submitted requests for transaction details (query response module 310). The memory 302 may also include a number of data stores, including high-level data 316, which maintains some information associated with transactions, and resource provider data 318, which maintains information identifying resource providers and their capabilities. In some embodiments, the processing server 300 may maintain a number of accounts into which users may be required to log in.

In some embodiments, the dispute resolution module 308 may, in conjunction with the processor 304, be configured to automatically initiate a dispute submitted by a user or authorization provider. In some embodiments, automated initiation of a dispute may require a specific set of transaction data to be provided by the merchant and verified. In some embodiments, the processing server 300 may, upon receiving an indication that a dispute has been initiated for a transaction, automatically submit a request for additional information via the query response module 310. Upon receiving a response that includes all of the requested transaction data, the dispute resolution module 308 may verify each piece of information and, provided each requested transaction data is provided and verified, determine whether to initiate the dispute by forwarding the information to an acquirer entity associated with the resource provider. In some embodiments, verification of transaction data may involve comparing the received transaction data to expected values. For example, verifying a user's signature may involve comparing a signature included in a digital signature provided during a transaction to a digital signature stored on file for a user. In some embodiments, the processing server 300 may receive additional data from a user device associated with the user whose transaction is being disputed. That additional data may also be used by the dispute resolution module 308. For example, the processing server 300 may receive location data obtained by a user's user device and may compare that location information to information indicating where the transaction took place to verify a location of the transaction.

In some embodiments, the dispute resolution module 308 may determine, based on information received from a resource provider in relation to a potential dispute, a likelihood of the resource provider's success. For example, the dispute resolution module 308 may determine, based on the verification of data provided by the resource provider, provide information to the resource provider on a likelihood that information stored by the service provider meets certain requirements needed to succeed in a dispute. The dispute resolution module 308 may be configured to receive an indication from the resource provider as to whether the resource provider wishes to proceed with the dispute. If the resource provider does elects not to proceed, then the dispute resolution module 308 may facilitate the transmission of a credit from the resource provider's acquirer back to the authorization provider in the transaction. Otherwise, the dispute resolution module 308 may release the dispute to the resource provider's acquirer for further processing.

In some embodiments, the query response module 310 may, in conjunction with the processor 304, be configured to, upon receiving a request for transaction details, determine a resource provider associated with the transaction, determine one or more capabilities/formats of that resource provider, and generate a request for additional transaction data to be provided to the resource provider. In some embodiments, the query response module 310 may be configured to interact with a GMR to obtain at least a portion of the transaction details. In some embodiments, the query response module 310 may be executed as part of a dispute resolution process. For example, the dispute resolution module 308 may cause the query response module 310 to be executed to obtain transaction data to be used in the dispute process.

The data stored in databases 316 and 318 may be dynamic, static, or some combination of dynamic and static data. In some embodiments, high-level data 316 may include any information about transactions conducted by one or more resource providers. The data included in the high-level data 316 may be received from a number of sources. For example, the data included in the high-level data 316 may be received from a resource provider, a transaction processing network, an authorization provider, or any other suitable entity. In some embodiments, the data included in high-level data 316 may be updated as new transactions are conducted. Resource provider data 318 may include information about resource providers as well as resource provider capabilities. For example, the resource provider data 318 may include information about information maintained by a resource provider as well as whether the resource provider maintains transaction data in a GMR. Information stored in resource provider data 318 may be provided by a resource provider, a transaction processing network, an acquirer, or any other suitable entity.

The processing server 300 may also contain communications interface(s) 322 that enable the processing server 300 to communicate with a stored database, another computing device or server, one or more remote devices, and/or any other suitable electronic devices. In some embodiments, the communication interface 322 may enable the processing server 300 to communicate with other electronic devices on a network 324 (e.g., on a private network). The processing server 300 may also include input/output (I/O) device(s) and/or ports 326, such as for enabling connection with a keyboard, a mouse, a pen, a voice input device, a touch input device, a display, speakers, a printer, etc.

In some embodiments, the network 324 may include any one or a combination of many different types of networks, such as cable networks, the Internet, wireless networks, cellular networks, and other private and/or public networks. While the illustrated example represents the user device 328 accessing the processing server 300 over the network 324, the described techniques may equally apply in instances where the user device 328 interacts with the processing server 300 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The processing server 300 may be in communication with a number of user devices 328 and/or resource providers 330. Each of the user devices 328 may be capable of interacting with the processing server 300 to access an account, request transaction data, or initiate a transaction dispute. Additionally, in some embodiments the user devices 328 may be capable of interacting with a resource provider 330 to complete a transaction. For example, the user devices 328 may include a web browser or other application that enables a user of the user device 328 to access a website maintained by the processing server 300 or resource provider 330.

The user device 328 may include one or more displays and/or speaker devices capable of presenting visual or audio content. In some embodiments, the user device 328 may include a mobile application 332, which may be a set of computer executable instructions (e.g. an application) which, when executed, causes the user device 328 to present data (e.g., transaction data) to a user and to obtain input from the user. In some embodiments, a mobile application 332 may be an application which is maintained on behalf of, and supported by, the processing server 300. For example, in some embodiments, the mobile application 332 may be used to access account information made available by the processing server 300.

In some embodiments, a resource provider 330 may be any computing device capable of conducting transactions with a user and of providing transaction details to a processing server 300. In some embodiments, the resource provider 330 may be a retailer (e.g., an electronic retailer) or some other resource provider which manages access to one or more resources (goods and/or services). In some embodiments, the resource provider 330 may include, in its memory, one or more modules for conducting a transaction for a resource (transaction module 334). In some embodiments, the resource provider 330 may store transaction data 336, which may details about transactions conducted by the resource provider 330. The resource provider 330 may provide access to transaction data 336 to a processing server 300. In some embodiments, the transaction data 336 may be stored on a computing device which is separate from the resource provider 330. For example, the transaction data 336 may be stored by, and retrieved from, a third party computing device. In at least some of these embodiments, the resource provider 330 may provide a pointer or link, and in some cases a cryptographic key, to a processing server 300 for particular data stored in the transaction data 336. In these embodiments, the processing server 300 may be configured to access content via the provided pointer or link.

In some embodiments, at least a portion of data related to transactions may not be stored by the resource provider 330. Instead, that portion of transaction data may be forwarded to, and hosted at, a data center 338 in transaction data 340. Transaction data 340 may be an example of a global merchant repository, as described with respect to GRM 110 of FIG. 1. The data center 338 may be operated by a third-party entity and may store transaction data for a number of different resource providers. In some embodiments, the resource provider 330 may provide transaction data to the data center 338 to be stored in transaction data 340 as new transactions are conducted. In embodiments in which transaction data is stored in a data center 338, a resource provider 330 may provide a location of requested data with the transaction data 340 to the processing server 300 in response to receiving a request.

In some embodiments, the resource provider 330 may also maintain a website or other network document. In at least some of these embodiments, the resource provider 330 may provide a URL or other suitable reference to the website to the processing server 300 for inclusion in details to be provided to the user device 328. The URL may then be presented to a user of the user device 338. Upon selection of the URL by a user of the user device 338, the user device 338 may be caused to load and present the website.

In some embodiments, the processing server 300 may maintain an account with respect to one or more user devices 328. It should be noted that an account maintained by the processing server 300 for the user device 328 may be different from an account maintained by a resource provider 330 for that same user device 328. Each of a processing server 300 and a resource provider 330 may separately maintain information related to a user in relation to their respective accounts.

Figure 4:
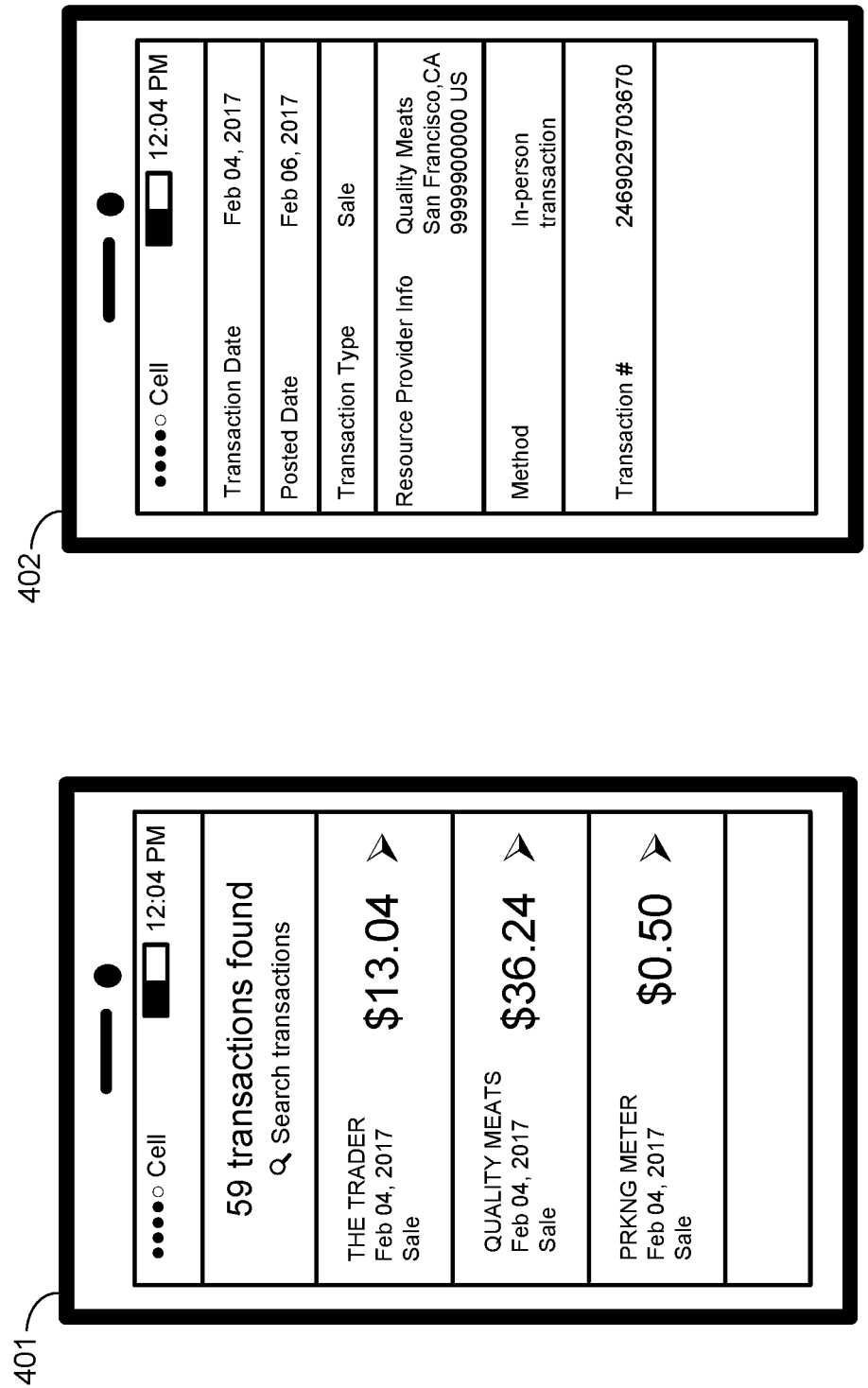
FIG. 4 shows user interfaces on a user device for a conventional digital statement and conventional transaction details available from a digital statement.
Figure 5:
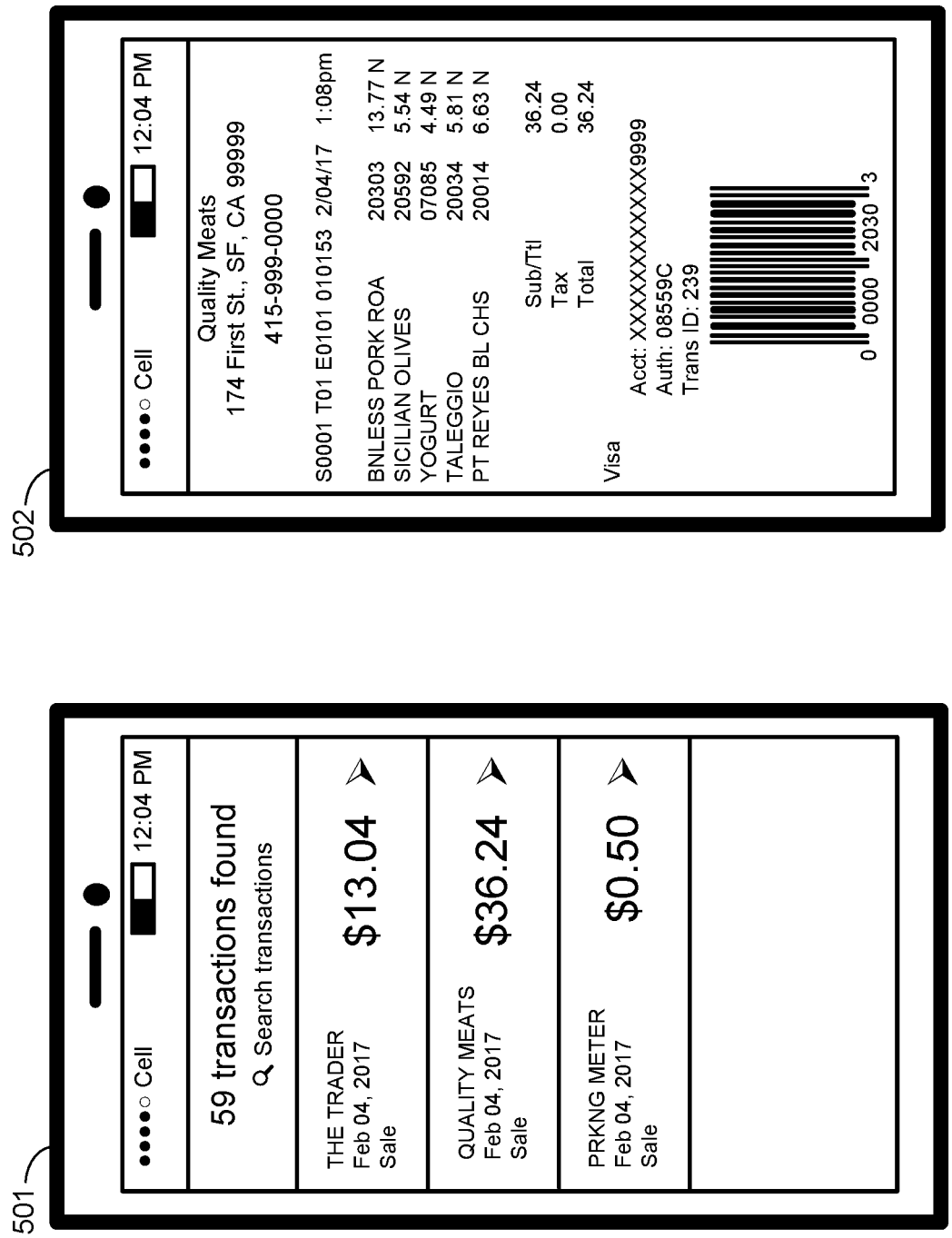
FIG. 5 shows user interfaces on a user device for a digital statement providing digital receipts, according to an embodiment of the invention.
Figure 6:
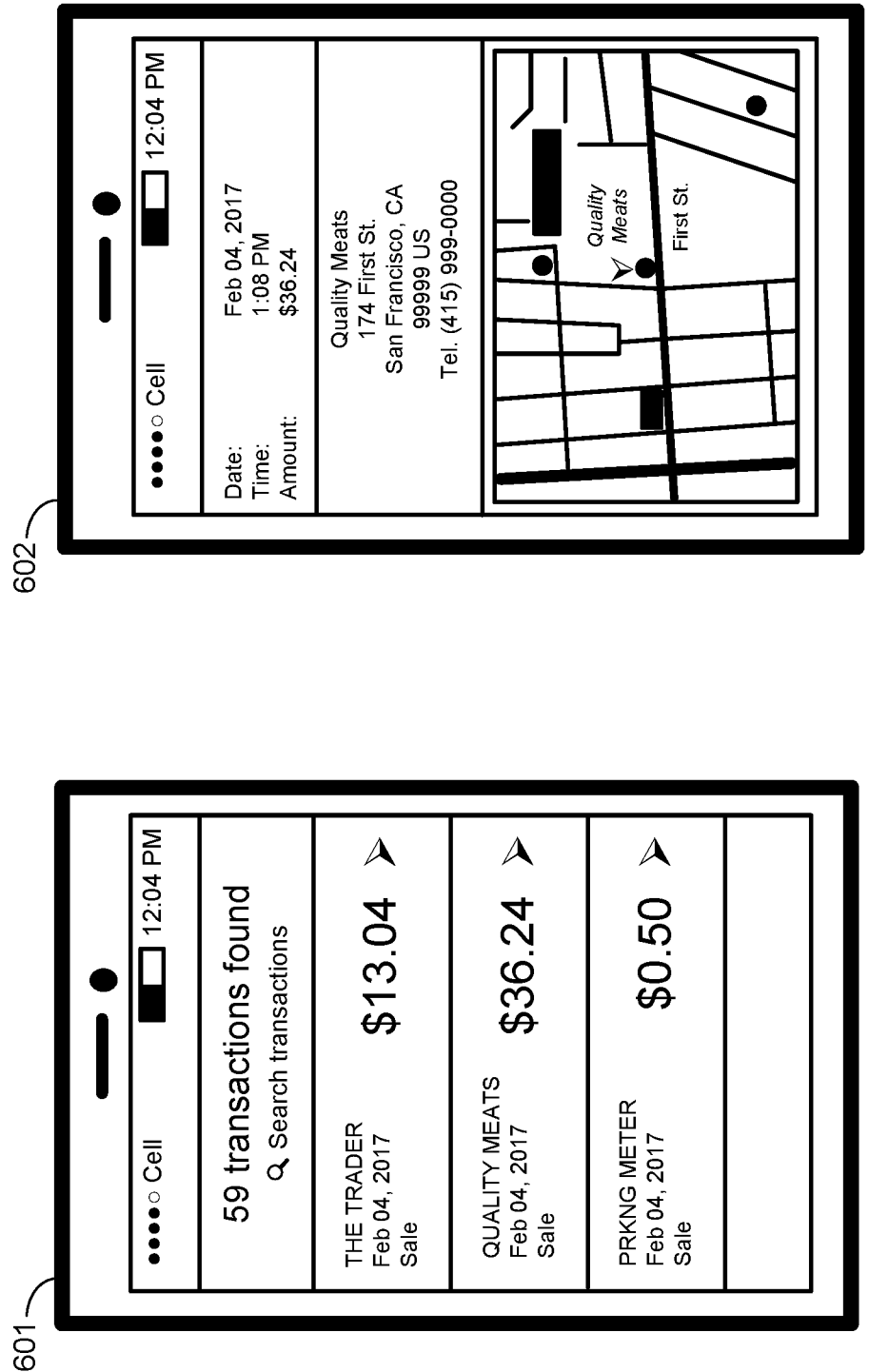
FIG. 6 shows user interfaces on a user device for a digital statement providing digital receipts, according to an embodiment of the invention.

FIGS. 4-6 show examples of user interfaces that may be displayed on a user device of a user. These user interfaces are simplified for explanation purposes and may not be drawn to scale.

FIG. 4 shows user interfaces on a user device for a conventional digital statement and conventional transaction details available from a digital statement. A first user interface 401 shows a conventional digital account statement provided by an authorization provider. Conventionally, account statements will provide a transaction data, a transaction amount, and a brief description of the transaction. The brief description may, or may not indicate a resource provider that the transaction was conducted at. Conventionally, the brief description does not indicate the goods or services purchased in the transaction or the quantities, individual prices, the sub total before tax, or the amount of tax applied to the transaction.

Certain conventional account statements may also provide a second user interface 402 showing some additional transaction information. For example, a conventional account statement may further indicate the posting date of the transaction, the type of transaction, an address of the resource provider, a method of the transaction, and a transaction number. However, this additional transaction information in conventional statements does not include as much information as a receipt does. For instance, the additional transaction information shown in the second user interface 402 lacks a listing of individual items purchased in the transaction and their prices. Thus, this additional information may not be sufficient to enable a user to determine whether the transaction is fraudulent.

FIG. 5 shows user interfaces on a user device for a digital statement providing digital receipts, according to an embodiment of the invention. A first user interface 501 shows a digital account statement provided by an authorization provider. The digital account statement shown in the first user interface 501 may be similar to the conventional user interface 401 shown in FIG. 4. However, when a user selects a transaction (e.g., by touching on a touch screen or by pointing with a mouse), a second user interface 502 displays a digital receipt that can be generated according to the method described above with respect to techniques described herein. The digital receipt includes the resource provider's name, street address, phone number, the date, the time of the transaction, individual items purchased in the transaction (five items in this example), the product numbers of the items (shown next to the item names), and the prices of the items. The digital receipt also includes the sub total before tax, the amount of tax, and the total transaction amount. The digital receipt also includes an indication of the account number used to conduct the transaction, and authorization reference number, and a transaction ID.

The digital receipt may also include an image, which is a bar code in this example. The bar code can be associated with one or more of the items purchased. In some examples, the digital receipt can include a bar code for each item. Having bar codes on digital receipts is advantageous because it enables a consumer to return a product to the resource provider even if they have lost their printed receipt. For example, if a consumer purchases an item of clothing, the resource provider may not be able to determine that the item was purchased from their store in particular without the receipt because other resource providers may sell the same item. For this reason, the resource provider may not accept the return without a receipt. An unfortunate consumer having lost their physical receipt can instead go online to their digital statement, identify the transaction, and print their digital receipt (or display it on their user device). Thus, the consumer may return their item using digital receipts whereas they would not be able to do so using conventional systems. In some embodiments, the digital statement may further include a search bar that enables the user to search for transactions using a name of a resource provider or a name of an item, making it quicker to identify particular transactions.

FIG. 6 shows user interfaces on a user device for a digital statement providing digital receipts, according to an embodiment of the invention. However, when a user selects a transaction (e.g., by touching on a touch screen or by pointing with a mouse), a second user interface 602 displays a digital receipt that can be generated according to techniques described herein. The digital receipt includes the resource provider's name, street address, phone number, the date, the time of the transaction, and the transaction amount. The second user interface 602 also includes a map that shows the street location of the resource provider. In some embodiments, the digital receipt shown in the second user interface 502 of FIG. 5 may also include a map as shown in the second user interface 602 of FIG. 6. The map is advantageous because even if the resource provider is not capable of providing digital receipts including item information and prices, a map may still be helpful in jogging a user's memory while checking their account statement.

Figure 7:
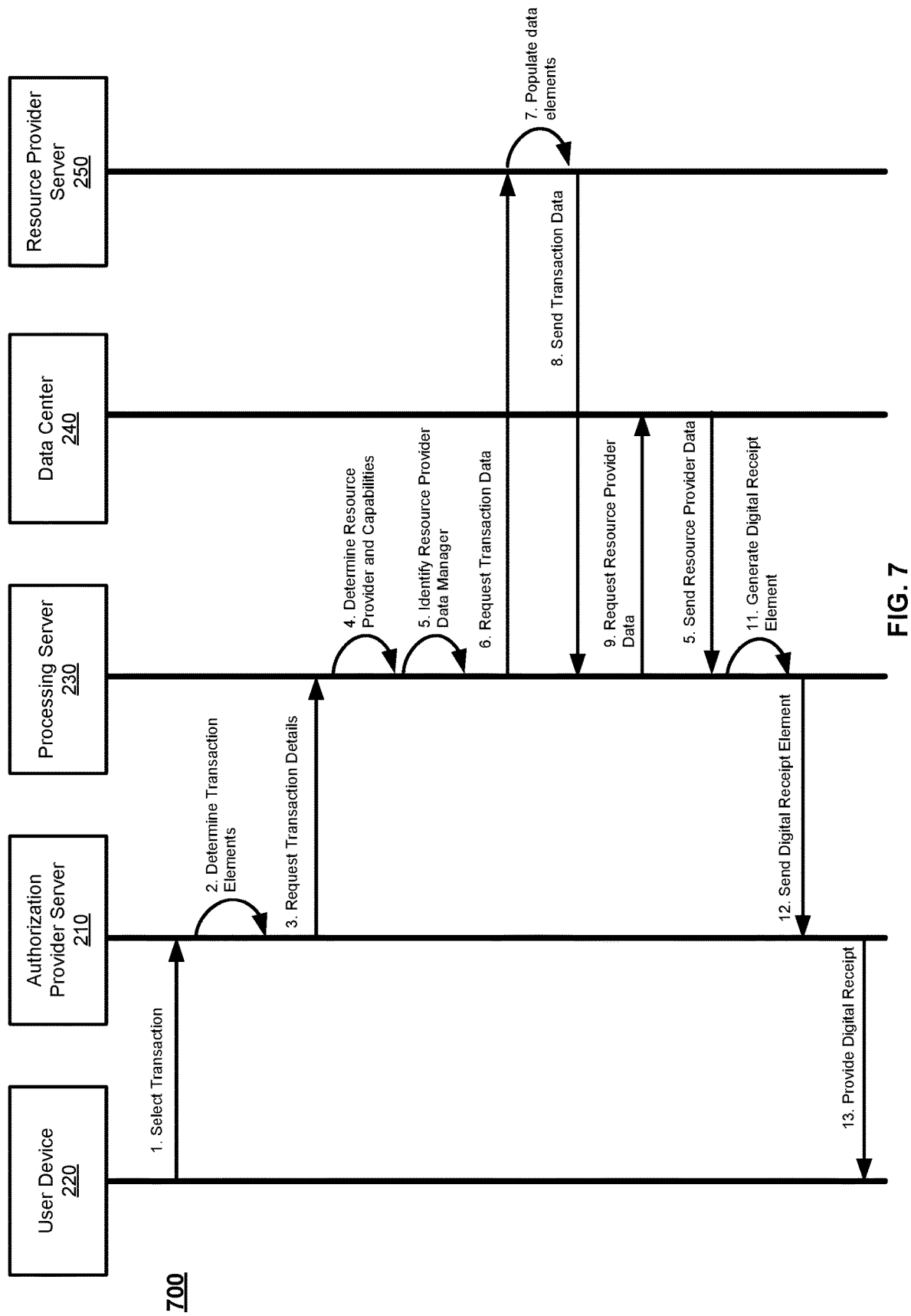
FIG. 7 shows a message flow diagram for providing additional transaction data to a user, according to at least some embodiments.

FIG. 7 shows a message flow diagram for providing additional transaction data to a user, according to at least some embodiments. The message flow diagram of FIG. 7 shows communication messages sent between various components which may include a user device 220, an authorization provider server 210, a processing server 230, a data center 240, and a resource provider server 250. The user device 220, authorization provider server 210, processing server 230, data center 240, and resource provider server 250 may store the same information and perform the same functionality as the respective components described above with respect to FIG. 2.

At step 1 of process 700, a user of the user device 220 can browse a digital statement provided by the authorization provider server 210 using a web browser or a software application. The user may click, tap on a link, or otherwise indicate an interest in seeing more information about a particular transaction using the user interface of the user device 220 (e.g., pointing and clicking with a mouse or touching on a touch screen). The transaction selected by the user may be associated with a transaction identifier that uniquely identifies that particular transaction among the transactions within the user's statement, or within all transactions maintained by the authorization provider server 210. The transaction identifier may then be included in a transaction data request, enabling the authorization provider to identify the selected transaction from amongst the transactions that it maintains. The user device 220 sends the transaction identifier of the selected transaction to the authorization provider computer 210. The authorization provider may maintain a table associating transaction identifiers with a particular transaction, which can be used to determine the transaction elements for the transaction. This transaction data request may indicate to the authorization provider computer 210 that the user is interested in obtaining a digital receipt. In some embodiments, the authorization provider server 210 determines the transaction identifier itself based on which link is selected on the user device 220, instead of the user device sending the transaction identifier.

At step 2 of process 700, the authorization provider server 210 determines a plurality of transaction elements associated with the selected transaction. The plurality of transaction elements can include identification information such as a service code, a card verification value, a dynamic card verification value, a primary account number or account number, a payment token, a user name, an expiration date, a trace number, a reference number, etc. The plurality of elements can also include transaction information, such as the transaction amount, a resource provider identifier, a card acceptor identifier, a terminal identifier, a resource provider location, an acquirer bank identification number, and any available information identifying items being purchased. In some embodiments, the transaction elements to be associated with a particular transaction may be determined based on a type or category of the transaction for which data is being requested. For example, different data elements may be requested for different types of transactions. In some embodiments, the plurality of data elements to be requested for a transaction may be determined based on configuration settings stored in relation to a user which is requesting the data. For example, the user may indicate what types of data elements should be presented to him/her during a request and those data elements may be identified at step 2.

At step 3 of process 700, the authorization provider server 210 sends a transaction data request to the processing server 230 that includes the one or more transaction elements of the plurality of transaction elements associated with the selected transaction. The transaction data request can be made as an API call to the processing server 230 according to a digital receipts API provided by the processing server 230. The one or more transaction elements in the transaction data request enable the processing server 230 to determine which resource provider was involved in the transaction. As discussed below, the one or more transaction elements in the transaction data request also enables a resource provider to uniquely identify the selected transaction. In some embodiments, the one or more transaction elements can include a resource provider identifier or an acceptor identifier (identifying the resource provider) for the selected transaction. The one or more transaction elements can also include a trace number or a reference number. In addition, any number and combination of the identification information and transaction information listed above may be provided as is necessary for a particular resource provider server. For example, the one or more transaction elements in a transaction data request can include the resource provider identifier, the transaction date, the transaction amount, and the account number. In another example, for a larger resource provider with several locations, the one or more transaction elements in a transaction data request can include the resource provider identifier, the resource provider location, the transaction date, the transaction amount, and the account number. In another example, the one or more transaction elements in a transaction data request can include the resource provider identifier and a trace number or a reference number.

In addition to providing additional transaction data (e.g., digital receipts), the processing server 230 can enhance, or supplement, that transaction data by including additional information regarding the resource provider, such as a street address, map of the street address, phone number, website address, etc. The processing server 230 can obtain resource provider information based on the one or more transaction elements. To do this, the processing server 230 determines a resource provider identifier based on the one or more transaction elements. The resource provider identifier may be the same as or derived from the resource provider identifier included in the transaction data request from the authorization provider server 210. In some embodiments, the additional information may be obtained from a global merchant repository, which receives information about various resource providers from a number of sources.

At step 4 of process 700, the processing server 230 determines a resource provider as well as capabilities of that resource provider. In some embodiments, the processing server 230 may obtain a number of data values related to the resource provider. For example, the processing server 230 may obtain a resource provider identifier, a store name, a resource provider name, a resource provider legal name, a resource provider category code, a resource provider category description, a resource provider street address, a city, state, postal code, and country code of the location that the resource provider is in, a phone number of the resource provider, and/or a website address (e.g., URL) of the resource provider. The resource provider capabilities can indicate whether the resource provider is capable of providing digital receipts (e.g., whether the resource provider has a resource provider server 250 capable of responding to digital receipt API calls from the processing server 230) as well as what data elements are maintained by the resource provider. The processing server 230 can maintain a resource provider capability table referencing resource processing identifiers with a YES or NO indication of whether they are capable of digital receipts. The capability information may be obtained during a registration process for the resource provider with the processing server 230. In this example, the resource provider associated with the transaction selected by the user is capable of providing digital receipts via the resource provider server 250.

At step 5 of process 700, the processing server 230 determines an entity which stores data associated with the resource provider. In some embodiments, data associated with a resource provider may be stored in a GMR. In some embodiments, data associated with a resource provider may be stored by the resource provider server 250. The processing server 230 can maintain a routing table indicating the network address of each resource management server and each of the resource providers associated with that particular resource management server. The routing table may further include routing information for each resource provider that is capable of providing digital receipts.

At step 6 of process 700, the processing server 230 sends a transaction data request to the resource provider server 250 associated with the resource provider identifier in the routing table. The transaction data request includes the one or more transaction elements received from the authorization provider 210.

At step 7 of process 700, the resource provider server 250 receives the transaction data request including the one or more transaction elements. The resource provider server 250 may be capable of uniquely identifying the transaction based on a transaction identifier associated with the transaction. After identifying the transaction, the resource provider server 250 determines data values which correspond to each of the plurality of data elements. The resource provider server 250 then generates a response to the request for transaction data in which each of the plurality of data elements are populated with a corresponding data value. The plurality of data elements may be formatted as a receipt for the identified transaction. In some embodiments, the transaction data can include one or more of an email account of the resource provider, a device name of the consumer's device, an application source or browser type for online transactions, a type of authentication conducted, an item description, stock keeping unit information, an item artist/select, and item type, an item quantity, an item price, an item category, resource provider contact information (e.g., phone number and/or email address), a shipping tracking number, a website link, a link to the item cold, a message from the resource provider, an image associated with the transaction, such as a bar code or QR code, or an image of a printed or digital receipt, a sub total for the transaction, a tax amount for the transaction, and a tip amount for the transaction. At step 8, the resource provider server 250 can send the transaction data to the processing server 230.

At step 9, the processing server 230 may contact a data center 240 which houses a global merchant repository if the processing server 230 determines that the resource provider reports data to a GMR in step 5 of process 700. The data center 240 may obtain information about the resource provider from a number of different sources, including a transaction processing network and/or a third party entity. in some embodiments, the processing server 230 may identify data elements which were not populated by the resource provider server 250 at step 7 and may request that those data elements be populated by the data center 240. At step 10 of process 700, the data center 240 may provide a response to the processing server that includes data values for those identified data elements.

At step 11, the processing server 230 receives the transaction data from the resource provider server 250 and/or the data center 240. In some embodiments, the processing server 230 may generate a digital receipt element based on the resource provider information and the transaction data. The digital receipt element may be may be an image (e.g., a Joint Photographic Experts Group ".jpg" file, a Portable Network Graphics ".png" file, etc.) or an image data object (e.g., a data file capable of including embedded images, such as a Portable Document Format ".pdf" file, a document ".doc" file, a Hypertext Markup Language ".html" file, etc."). The digital receipt element may also be a text file (e.g., a comma-separated values ".csv" file, a text ".txt" file, an Extensible Markup Language "xml" file, etc.) or other suitable data file. In some embodiments, the transaction data could be the same or similar to the digital receipt element.

At step 12, the processing server 230 sends the digital receipt element to the authorization provider server 210. In some embodiments, the processing server 230 can provide the digital receipt element via a hosted webpage. In such embodiments, the processing server 230 provides a web address (e.g., URL) of the digital receipt element.

In some embodiments, the processing server 230 can briefly store the digital receipt element (e.g., the image or image data object) and then delete the digital receipt element from storage after the digital receipt element is provided via the hosted web page. In some embodiments, the processing server 230 may store the digital receipt element in short-term storage. The processing server 230 may delete the digital receipt element based on an expiration condition, such as an amount of time passing or a number of times that the digital receipt element has been accessed.

It should be noted that it is advantageous for the data processing server 230 to not store the digital receipt element (or transaction data) because the number of transactions processed by the processing server 230 is very large (e.g., 150 million transactions per day) if the processing server 230 serves as a hub, or switch, by routing transactions between various authorization provider computers (e.g., issuer computers) and transport computers (e.g., acquirer computers). Digital receipt elements may contain images, which consume a relatively large amount of storage space, as well as non-trivial amounts of text. It would be very difficult for a single server or computer system to handle such a large amount of data coming from thousands of merchants. To overcome this problem, embodiments of the invention can use a combination of different and distributed transaction data storage systems. Such transaction data storage systems may include the resource providers (e.g., the merchants), the acquirers (who may house transaction data for many merchants), and resource provider servers (which may store receipts for multiple merchants). Using this combination of storage systems, the processing server 230 need not store any transaction data, but may serve to pull transaction data from various pre-existing transaction data sources. Receipts can be generated on demand, via a user's monthly statement provided by the user's issuer. This architecture is also advantageous, because the resource providers (and their resource provider servers) are better able to scale their storage requirements along with the number of transactions that they conduct. Independent receipt storage systems are unable to anticipate the number of sales that might be conducted by the many thousands of existing merchants. Thus, it becomes possible to store data for generating digital receipts through proportionally distributed, data storage systems.

At step 13, the authorization provider server 230 receives the digital receipt element from the processing server 230 and provides a digital receipt to the user device 220. If the digital receipt element is an image or image data file, the authorization provider can display the image itself. If the digital receipt element is a text, document, or data file including the transaction data, the authorization provider server can generate a digital receipt based on the information included in the digital receipt element. The user interface of the user device 220 is further described above with respect to FIGS. 4-6.

Figure 8:
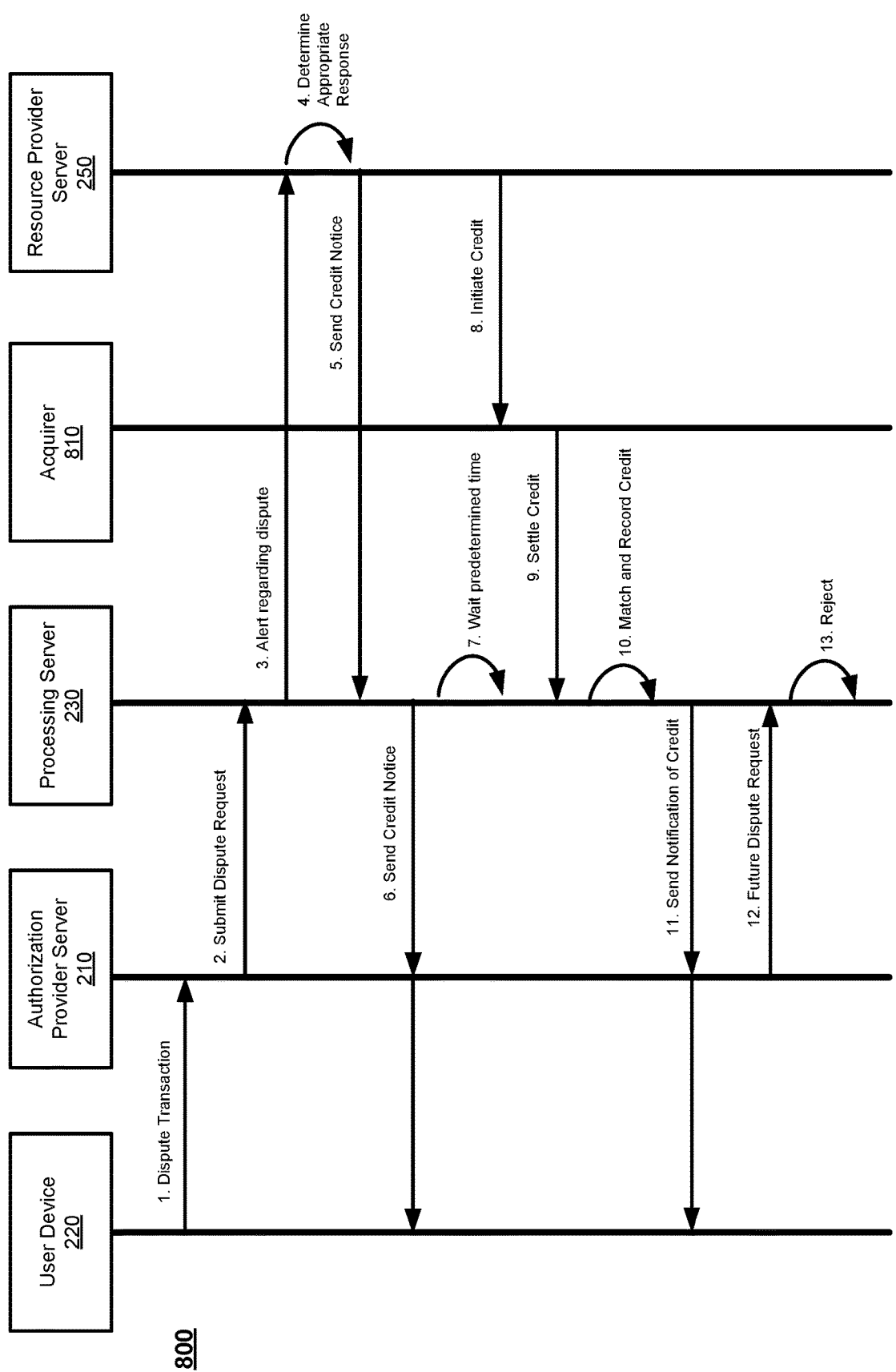
FIG. 8 shows a message flow diagram for providing rapid dispute resolution in which a credit is provided in accordance with at least some embodiments.

FIG. 8 shows a message flow diagram for providing rapid dispute resolution in which a credit is provided in accordance with at least some embodiments. The message flow diagram of FIG. 8 shows communication messages sent between a user device 220, an authorization provider server 210, a processing server 230, a resource provider server 250, and an acquirer 810. The user device 220, authorization provider server 210, processing server 230, and resource provider server 250 may store the same information and perform the same functionality as those same entities described above with respect to FIG. 2.

At step 1 of process 800, a user of the user device 220 can browse a digital statement provided by the authorization provider server 210 using a web browser or a software application. The user may click, tap on a link, or otherwise indicate an interest in initiating a dispute for a particular transaction using the user interface of the user device 220 (e.g., pointing and clicking with a mouse or touching on a touch screen). The transaction selected by the user may be associated with a transaction identifier that uniquely identifies that particular transaction amongst the transactions within the user's statement, and/or within all transactions maintained by the authorization provider server 210. The transaction identifier may then be included in a dispute request, enabling the authorization provider to identify the selected transaction from amongst the transactions that it maintains for initiating a dispute for that transaction. The transaction identifier may be a transaction identifier generated by an acquirer 810 during completion of the transaction selected to be disputed. The user device 220 sends the dispute request to the authorization provider computer 210.

At step 2 of process 800, the authorization provider server 210 determines whether to initiate the dispute or whether no dispute is necessary. For example, the authorization provider server 210 may determine that the user is responsible for covering the charges or may alternatively decide to cover the charges associated with the transaction. If the authorization provider server 210 determines that the merchant should be responsible for covering the charges associated with the transaction, then the authorization provider server 210 may submit a dispute request to the processing server 230. The authorization provider server 210 may include a transaction identifier and/or merchant identifier in the dispute request sent to the processing server 230. In some embodiments, the dispute request may be a TC40 chargeback request. The dispute request may include the transaction identifier for the transaction which is being disputed.

At step 3 of process 800, the processing server 230 receives the dispute request and determines the resource provider associated with that dispute request. The dispute request can be made as an API call to the processing server 230 according to a transaction dispute API provided by the processing server 230. The transaction identifier and/or merchant identifier in the transaction data request enable the processing server 230 to determine which resource provider was involved in the transaction. In some embodiments, a transaction identifier in the transaction data request may also enable a resource provider to uniquely identify the selected transaction. In some embodiments, for a larger resource provider with several locations, the dispute request can include the resource provider identifier, the resource provider location, the transaction date, the transaction amount, and the account number, which can be used to identify the transaction.

At step 4 of process 800, the resource provider server 250 receives a dispute alert related to the dispute request from the processing server 230 and determines an appropriate response. In some embodiments, this may involve determining if the resource provider server 250 has each of a number of required elements obtained in relation to the transaction. For example, the resource provider server 250 may determine if it has a digital signature from the customer in relation to the transaction, appropriate verification values (e.g., a CVV or DCVV value), or any other required transaction elements. In some embodiments, the authorization provider server 210 may send a digital signature (e.g., an electronic version of handwritten signature of a legitimate user) (or a hashed value of the digital signature) to the processing server 230, which may be forwarded to the resource provider server 250 within the dispute alert. In at least some of those embodiments, the resource provider server 250 may compare a digital signature obtained in the transaction to the digital signature provided to determine a likelihood of succeeding in the dispute. For example, the signature on a credit card receipt obtained by a merchant may be completely different than a signature provided by an authorizing entity such as a bank. In this case, the resource provider operating the resource provider server 250 is unlikely to win a dispute, since the difference in signatures is significant and the resource provider should have verified that the signature received from the person conducting the transaction was authentic.

In some embodiments, the resource provider server 250 may determine whether going through the dispute process is financially advantageous. For example, the resource provider server 250 may calculate a probability of winning the dispute, multiply that by the amount of the transaction, and subtract the cost of processing the dispute (through an acquirer) to determine an expected value of the transaction. If the expected value is negative or zero, then the resource provider server 250 may determine that an appropriate response would be to simply credit the disputed amount. If the resource provider server 250 determines that the expected value is positive, then the resource provider In some embodiments, step 4 of process 800 may involve multiple communications between the resource provider server 250 and the processing server 230. For example, at step 4, the resource provider server 250 may retrieve any relevant data elements stored in relation to the transaction and provide those to the processing server 230. The processing server 230 may then verify the information contained in those data elements to determine a likelihood that the resource provider server 250 is likely to succeed in the dispute. The processing server 230 may then provide that likelihood value to the resource provider server 250, which may then make a determination as to whether the dispute should proceed based on that likelihood value. For example, the processing server 230 may obtain a copy of an electronic signature received from a customer in a transaction and may compare that electronic signature to one received from the authorization provider server 210 or stored on record in order to access the likelihood that the transaction is fraudulent. If the signatures do not match, then the processing server 230 may determine the statistical likelihood of the resource provider succeeding in the dispute based on historical data for similar disputes processed by the resource provider's acquirer.

At step 5 of process 800, the resource provider server 250 may provide a response to the dispute alert to the processing server 230. In FIG. 5, the resource provider server 250 may determine that at least a portion of the amount associated with the transaction should be credited back to the customer. Accordingly, the response to the dispute alert provided to the processing server 230 may indicate that an amount is being credited. In some embodiments, the response may also include the transaction identifier indicating the transaction for which the credit is being provided. In some embodiments, upon receiving the response, the processing server 230 may request the transaction identifier from the resource provider server 250. For example, the processing server 230 may provide a separate request for the transaction identifier from the resource provider server 250 upon receiving the response that includes a reference identifier that can be used by the resource provider server 250 to identify the credit response. The resource provider server 250 may then provide the transaction identifier for the original (disputed) transaction in a response to the processing server 230.

At step 6 of process 800, the processing server 230 may forward a credit response to the authorization provider server 210, which may subsequently forward that credit response to the user device 220. The credit response provided at step 6 may indicate that at least some portion of the disputed transaction amount is being credited back to the user. In some embodiments, the credit response may include the transaction identifier, which can be used by the authorization provider server 210 to map the credit response to its corresponding transaction.

At step 7 of process 800, the processing server 230 may enter a monitoring period for a predetermined period of time in which the processing server 230 monitors settlement notices for a credit response as well as a subsequent funds transfer that corresponds to the credit response. In some embodiments, the processing server 230 may, upon receiving the credit response in step 5 of process 800, continue to monitor for a notice of a settlement from an acquirer associated with the resource provider in which an indicated transaction identifier matches the transaction identifier included in the dispute request.

At step 8 of process 800, the resource provider server 250, subsequent to sending the credit response and while the processing server 230 is in the monitoring period described in step 7 of process 800, may initiate a credit with its acquirer. In some embodiments, this may involve contacting the acquirer and providing instructions to move funds from an account maintained on behalf of the resource provider to an account maintained on behalf of the authorization provider at the same or a different acquirer. In some embodiments, the acquirer 810 may be instructed to complete the funds transfer as a push transaction using a payment processing network that includes the processing server 230. The transaction identifier for the original (disputed) transaction is provided to the acquirer by the resource provider server 250 and included in the funds transfer by the acquirer. At step 9 of process 800, the acquirer may settle the credit by initiating the funds transfer.

At step 10 of process 800, the processing server 230 may, within the monitoring period described in step 7 of process 800, receive an indication of the funds transfer initiated at step 9 of process 800. In some embodiments, the processing server 230 may receive a settlement notice provided via a payment processing network that includes the transaction identifier associated with the dispute. Upon receiving the indication of the funds transfer within the monitoring period, the processing server 230 may match the funds transfer to the dispute request and record the credit. It should be noted that if the indication of the funds transfer is not received within the monitoring period, the processing server 230 may release the dispute to the acquirer to be processed.

At step 11 of process 800, the processing server 230 may communicate a notification of the credit being provided to the authorization provider server 210, which may subsequently provide forward that notification to the user device 220. In some embodiments, future dispute requests that include the same transaction identifier as the one recorded at step 10 may be automatically rejected. For example, as depicted at step 12 of process 800, the processing server 230 may subsequently receive a second dispute request that includes the same transaction identifier as the dispute request received at step 2. Upon receiving that dispute request, the processing server 230 may determine that the credit for the transaction has already been processed and may automatically reject the dispute request at step 13 of process 800.

Figure 9:
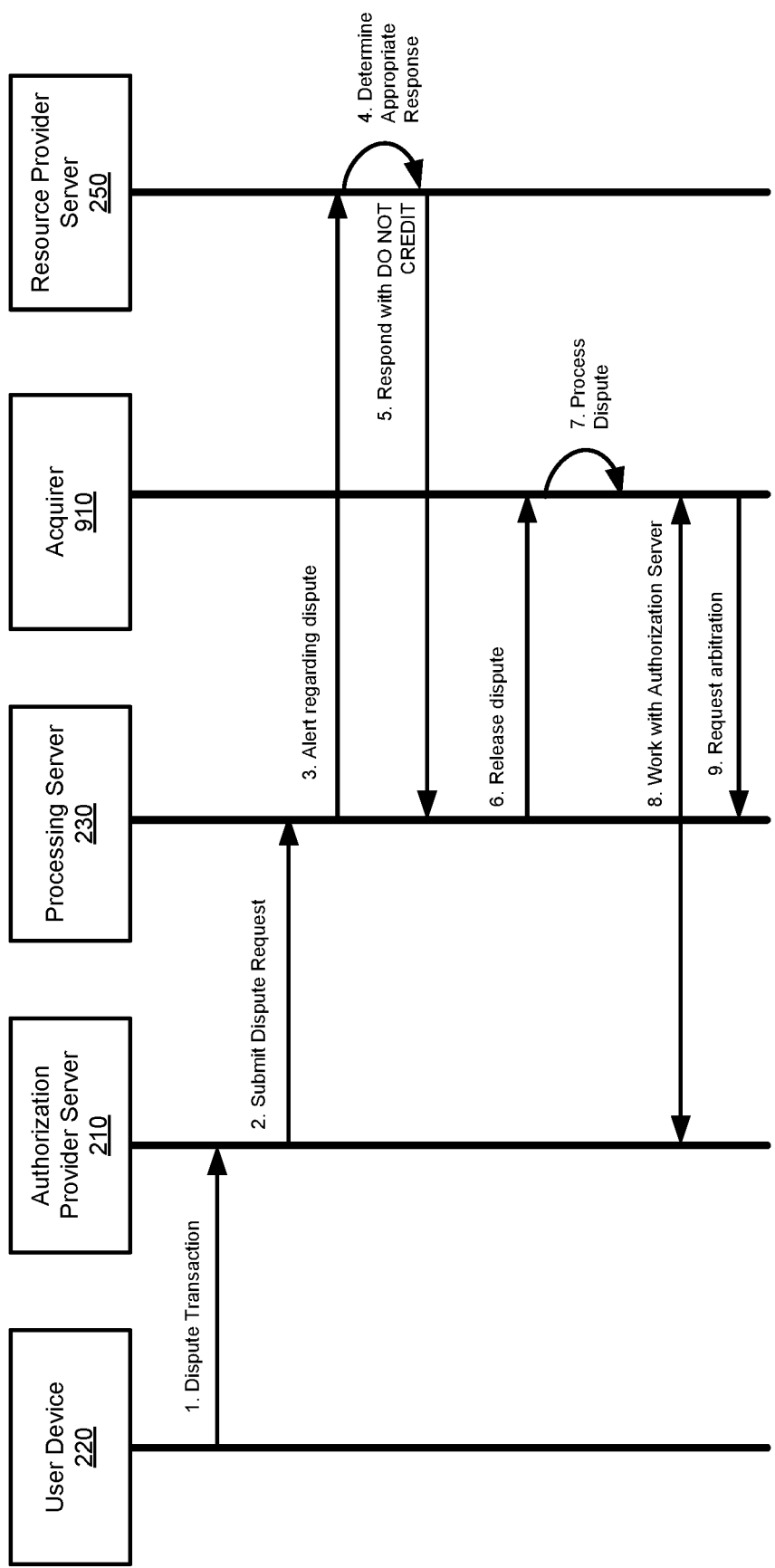
FIG. 9 shows a message flow diagram for providing rapid dispute resolution in which a resource provider determines to allow a dispute to proceed in accordance with at least some embodiments.

FIG. 9 shows a message flow diagram for providing rapid dispute resolution in which a resource provider determines to allow a dispute to proceed in accordance with at least some embodiments. The message flow diagram of FIG. 9 shows communication messages sent between a user device 220, an authorization provider server 210, a processing server 230, a resource provider server 250, and an acquirer 910. The user device 220, authorization provider server 210, processing server 230, and resource provider server 250 may store the same information and perform the same functionality as those same entities described above with respect to FIG. 2.

In FIG. 9, steps 1-4 can be substantially similar to steps 1-4 described with respect to FIG. 8. The descriptions of those steps are incorporated herein, and need not be repeated for the sake of brevity.

At step 5 of process 900, the resource provider server 250 may provide a response to the dispute alert to the processing server 230. In FIG. 5, the resource provider server 250 may determine no portion of the amount associated with the transaction should be covered by the resource provider. Accordingly, the response to the dispute alert provided to the processing server 230 may indicate that the dispute should proceed. In some embodiments, the resource provider server 250 may determine that (either on its own or based on information provided by the processing server 230) that the resource provider 250 has a high likelihood of succeeding in the dispute. In some embodiments, the resource provider 250 may determine, based on information stored in relation to the transaction being disputed, that it has met all legal/contractual requirements, such that the resource provider is entitled to payment for the transaction.

At step 6 of process 900, the processing server 230 may, upon receiving the response from the resource provider server 250, initiate the dispute by releasing the dispute to the acquirer. In other embodiments, the processing server 230 may adjudicate the dispute. At step 7 of process 900, the acquirer may then process the dispute in its normal fashion. In some embodiments, this may involve communicating with the authorization provider server 210 at step 8 of process 900 to reach a dispute resolution. In some embodiments, this may involve requesting arbitration of the dispute from the processing server 230 at step 9.

Figure 10:
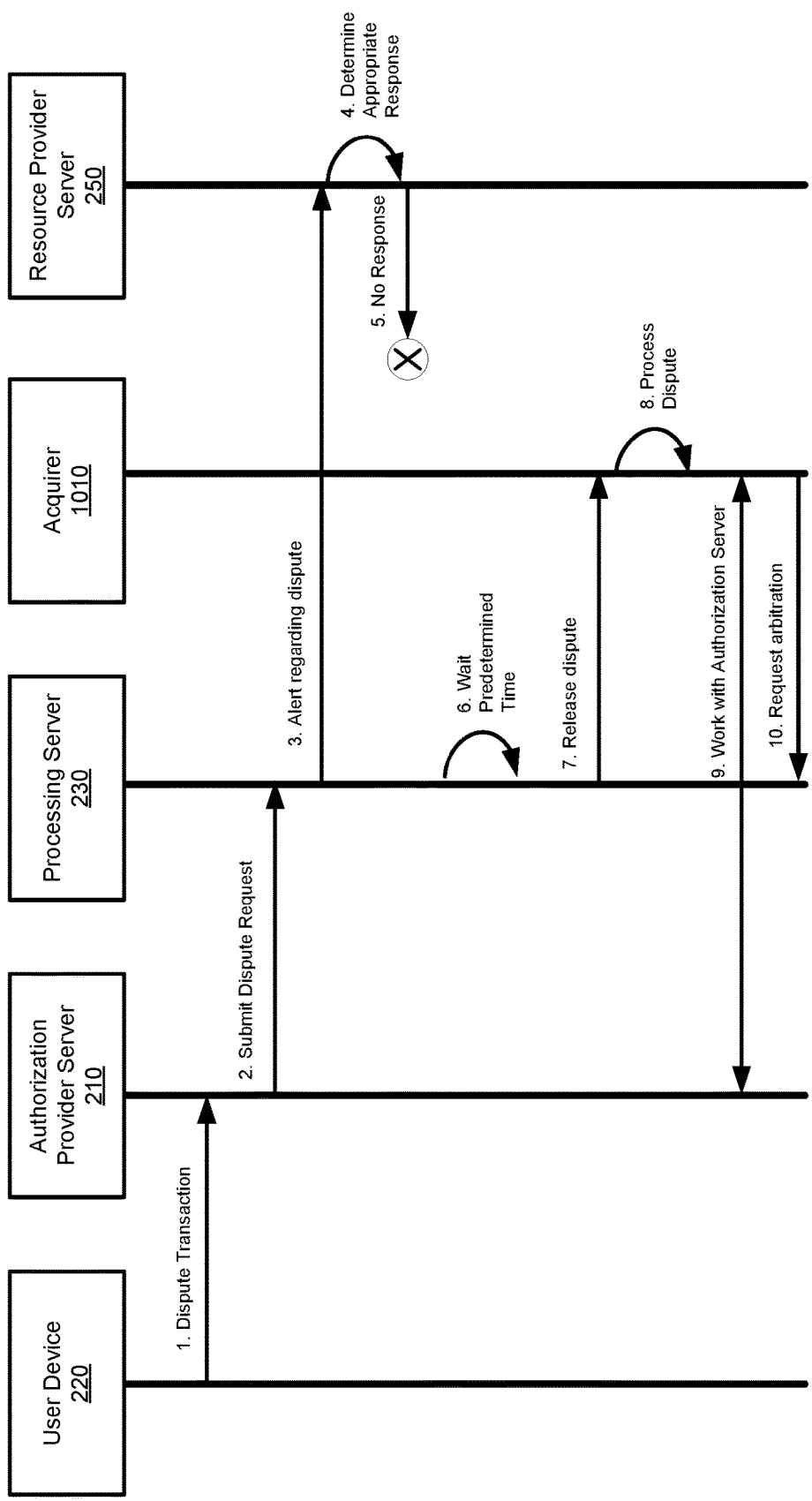
FIG. 10 shows a message flow diagram for providing rapid dispute resolution in which a resource provider does not timely respond to a dispute alert in accordance with at least some embodiments.

FIG. 10 shows a message flow diagram for providing rapid dispute resolution in which a resource provider does not timely respond to a dispute alert in accordance with at least some embodiments. The message flow diagram of FIG. 10 shows communication messages sent between a user device 220, an authorization provider server 210, a processing server 230, a resource provider server 250, and an acquirer 1010. The user device 220, authorization provider server 210, processing server 230, and resource provider server 250 may store the same information and perform the same functionality as those same entities described above with respect to FIG. 2.

In FIG. 10, steps 1-4 can be substantially similar to steps 1-4 described with respect to FIG. 8. The descriptions of those steps are incorporated herein, and need not be repeated for the sake of brevity.

At step 5 of process 1000, the resource provider server 250 may fail to provide a timely response to the dispute alert to the processing server 230. In some embodiments, the resource provider server 250 may simply choose not to respond to the dispute alert. In some embodiments, the resource provider server 250 may provide a response which is received outside of a predetermined period of time during which the processing server 230 monitors for a response by the resource provider server 250.

At step 6 of process 1000, the processing server 230 may enter a monitoring period for a predetermined period of time in which the processing server 230 monitors for a response from the resource provider server 250. The process 1000 may then be continued upon expiration of the predetermined period.

At step 7 of process 1000, the processing server 230 may, upon not receiving a timely response from the resource provider server 250, initiate the dispute by releasing the dispute to the acquirer. At step 8 of process 1000, the acquirer may then process the dispute in its normal fashion. In some embodiments, this may involve communicating with the authorization provider server 210 at step 9 of process 1000 to reach a dispute resolution. In some embodiments, this may involve requesting arbitration of the dispute from the processing server 230 at step 10.

Figure 11:
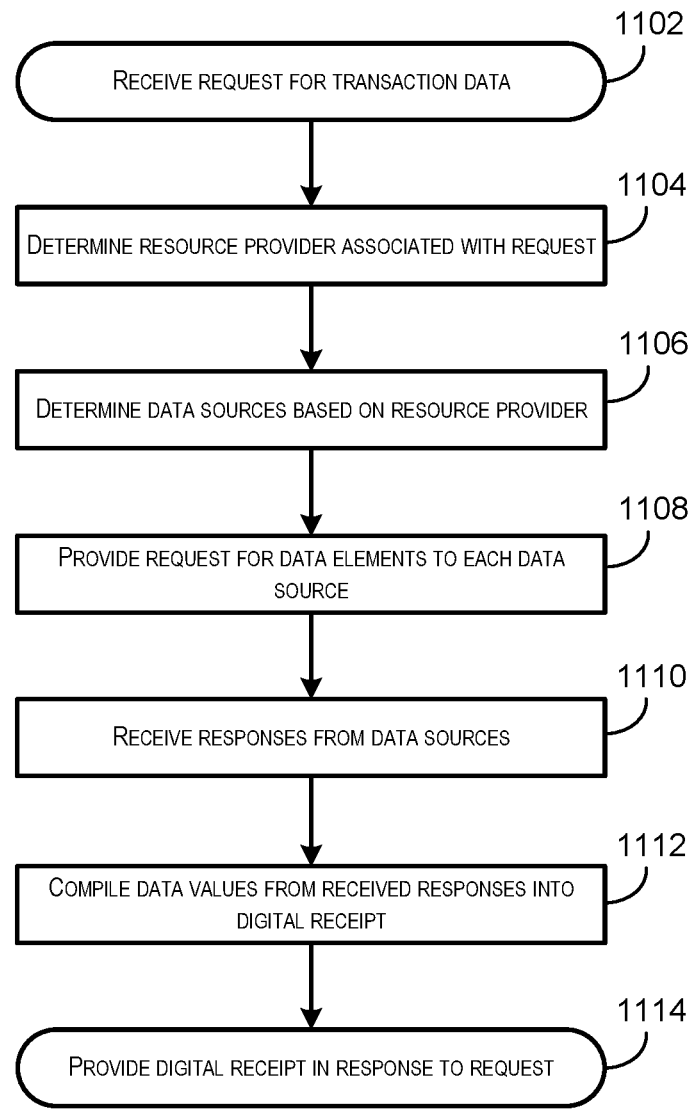
FIG. 11 depicts a flow diagram illustrating an example process for providing additional transaction details to a user device in response to receiving a transaction data request in accordance with at least some embodiments.

FIG. 11 depicts a flow diagram illustrating an example process for providing additional transaction details to a user device in response to receiving a transaction data request in accordance with at least some embodiments. The process 1100 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1100 (or any other processes described herein, or variations and/or combinations thereof) may be performed under the control of one or more computer systems configured with executable instructions and may be implemented as code (e.g., executable instructions, one or more computer programs or one or more applications). In accordance with at least some embodiments, the process 1100 of FIG. 11 may be performed by a processing server 300 as depicted in FIG. 3. The code may be stored on a computer-readable storage medium, for example, in the form of a computer program including a plurality of instructions executable by one or more processors. The computer-readable storage medium may be non-transitory.

Process 1100 may begin at 1102, when a request is received for transaction data. The request may be received by the processing server from an authorization provider server or a user device. The request may include a transaction identifier which uniquely identifies a transaction conducted with a resource provider using an account maintained by an authorization provider. The request may include a number of data elements for which data values are being requested. In some embodiments, the number of data elements may include one or more of an address of the resource provider, details about goods or services provided by the resource provider, or an identity of the resource provider. In some embodiments, the request is received by the authorization provider from a user associated with an account used to conduct the transaction via an online portal hosted by the authorization provider.

At 1104, the process 1100 may involve determining a resource provider associated with the received request. In some embodiments, the resource provider may be determined based on a merchant identifier included in the request. In some embodiments, the resource provider may be determined based on a transaction identifier included in the request. For example, the processing server may have access to a data store which houses a number of basic, or high-level, details pertaining to transactions conducted over a payment processing network. This data store may be queried on the transaction identifier to determine the resource provider. In some embodiments, the processing server may also determine one or more capabilities of the resource provider. For example, the processing server may determine what sorts of data the resource provider is capable of obtaining and/or storing (e.g., biometric data, digital signatures, etc.).

At 1106, the process 1100 may involve determining one or more data sources associated with the resource provider. In some embodiments, transaction data may be stored on a server operated by, or on behalf of, the resource provider. In some embodiments, transaction data may be stored within a global merchant repository on behalf of the resource provider.

At 1108, the process 1100 may involve generating a request for data elements for each of the determined data sources. For example, a first request may be generated for a first set of data elements to be obtained from a first data source and a second request may be generated to request a second set of data elements from a second data source. The generated requests may then be transmitted to each of the respective data sources. The requests for data values may be provided to each of the determined one or more sources using application programming interfaces associated with each of the determined one or more sources.

At 1110, the process 1100 may involve receiving responses to each of the generated requests. At 1112, the process 1100 may involve compiling the data values received in the requests for each of the data elements into a digital receipt element. In some embodiments, the process 110 may further involve verifying at least one data value received in at least one response. For example, the processing server may verify a digital signature of the response received from the resource provider. In another example, the processing server may compare one or more data values received from a first data source to corresponding data values received from a second source. In some embodiments, the data values from the responses may be compiled into a digital receipt element in a format specified by the authorization provider. In these embodiments, at least a portion of the number of data elements and the format specified by the authorization provider may be selected by a user associated with an account used to conduct the transaction. At 1114, the process 1100 may involve providing the digital receipt element in response to the received request.

Figure 12:
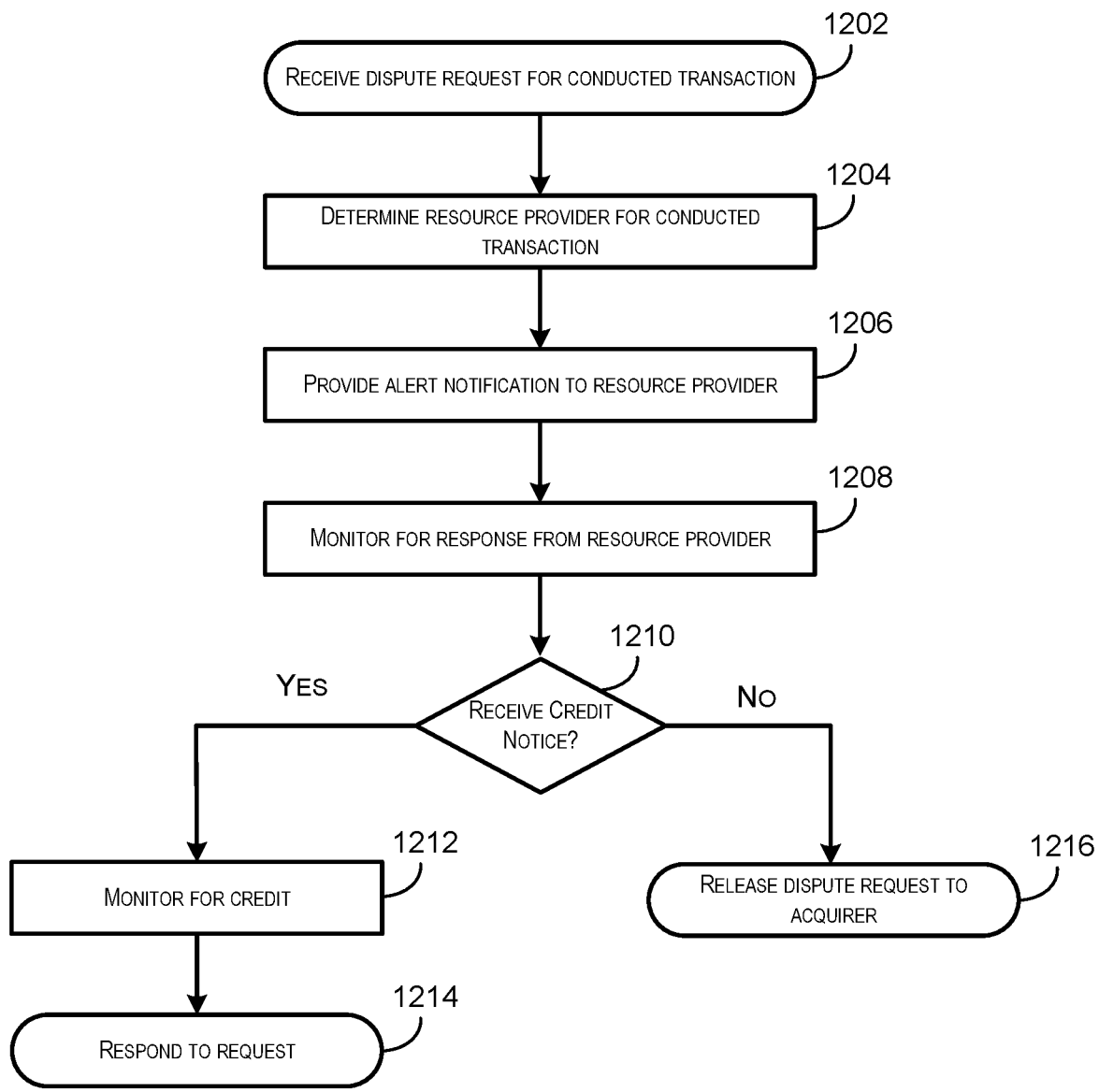
FIG. 12 depicts a flow diagram illustrating an example process for providing a mechanism by which a resource provider can prevent disputes from being processed by an acquirer in accordance with at least some embodiments.

FIG. 12 depicts a flow diagram illustrating an example process for providing a mechanism by which a resource provider can prevent disputes from being processed by an acquirer in accordance with at least some embodiments. In accordance with at least some embodiments, the process 1200 of FIG. 12 may be performed by a processing server 300 as depicted in FIG. 3.

Process 1200 may begin at 1202, when a dispute request is received with respect to a particular transaction. The request may include a transaction identifier which uniquely identifies a transaction conducted with a resource provider using an account maintained by an authorization provider.

At 1204, the process 1200 may involve determining a resource provider associated with the received request. In some embodiments, the resource provider may be determined based on a merchant identifier included in the request.

In some embodiments, the resource provider may be determined based on a transaction identifier included in the request. For example, the processing server may have access to a data store which houses a number of basic, or high-level, details pertaining to transactions conducted over a payment processing network. This data store may be queried on the transaction identifier to determine the resource provider.

At 1206, the process 1200 may involve providing an alert notification to the resource provider that a dispute request has been received. The alert notification may include the transaction identifier for the transaction as well as an indication as to the type of dispute at issue.

At 1208, the process 1200 may involve monitoring for a response from the resource provider for a predetermined period of time. In some embodiments, the process may further involve receiving information about the transaction from the resource provider, determining a likelihood of success for the resource provider in the dispute request based on the received information, and providing, to the resource provider, that likelihood of success. The likelihood of success may represent a probability that the resource provider will prevail in the dispute request. In some embodiments, the likelihood of success may be determined based on a degree to which data values in the received information match expected data values. In some embodiments, the likelihood of success may be determined based on a degree to which data obtained by the resource provider during the transaction complies with one or more requirements. In some embodiments, the likelihood of success may be determined based on statistical analysis of similar dispute requests. For example, the processing server may assess similar dispute requests that have been processed by the acquirer in the past.

At 1210, the process 1200 may involve determining whether a credit response has been received from the resource provider within the predetermined period of time.

At 1212, the process 1200 may involve determining that the resource provider has responded to the alert notice with a credit response. Upon making this determination, the processing server may monitor settlement notices for a credit which corresponds to the credit response.

At 1214, the process 1200 may involve, upon detecting the credit which corresponds to the credit response, the processing server may respond to the request received at 1202 with an indication that the credit has been issued. The credit may be determined to correspond to the credit response via the transaction identifier At 1216, the process 1200 may involve determining that the resource provider has not timely responded to the alert notice with a credit response. For example, the resource provider may not have responded at all or may have responded with a "do not credit" response. Upon making this determination, the processing server may release the dispute to an acquirer associated with the resource provider to be processed. If the processing server receives a "do not credit" response from the resource provider, then the processing server may release the dispute to the acquirer before the predetermined period of time has ended (e.g., when the response is received).

In some embodiments, the process 1200 may further involve receiving a second dispute request that includes the transaction identifier and automatically rejecting the second dispute request. For example, upon either receiving a credit response or releasing the dispute request to the acquirer, any further dispute for the same transaction may be declined automatically.

Embodiments of the invention present a number of advantages. As discussed above, conventional systems have the disadvantage that consumers are often not provided with sufficient information to verify the accuracy of the transactions listed on the account statement and this deficiency cannot be overcome through diligent collection of physical and digital receipts. However, the embodiments described herein overcome these disadvantages by providing digital receipts having sufficient information to enable the consumer to verify the accuracy of the transactions, reducing time and costs to consumers, authorizing entities, and resource providers in performing transaction verification, "requests for copy," and dispute management. Further advantages of the embodiments are described below.

In addition, embodiments of the invention are advantageous because they proportionally distribute storage of digital transaction data among resource providers, overcoming storage difficulties due to the large amount of data. As discussed above, it is advantageous for the data processing server not to store the digital receipt elements at a single processing server, because the number of transactions processed by that processing server can be very large (e.g., 150 million transactions per day) and the digital receipt element may contain images, which consume a relatively large amount of storage space, as well as non-trivial amounts of text In addition, users receive the benefit of an enhanced transaction experience. Providing digital receipts in a real-time and on-demand manner makes it easier for users to recognize legitimate and fraudulent transactions. Also, the users transactions are organized by date on their monthly statements, and this organization makes it easier for them to find receipts for their transactions. For example, users can often remember what month they conducted a transaction, or can do a search through their issuer's Website for a particular merchant to help locate a particular receipt. This capability does not exist in conventional systems. Further, methods and systems make recordkeeping easier for users, such as keeping records of transactions for returns, service, or tax purposes. Furthermore, providing digital receipts via their issuer's website or software application is more convenient and efficient for users checking for fraudulent transactions, compared to conventional receipt tracking methods and systems, since the user would be initiating a dispute through their issuer. There is no need for the user to compare between two separate lists of transactions (e.g., the issuer statement and their separate receipt management system).

Further, embodiments of the invention improve resource provider's omnichannel experience. Frequently resource providers experience some difficulty in managing records of transactions from different sources, such as in store, online, or by phone. By providing resource providers with a method of providing digital receipts, resource providers can utilize a single digital receipt system for any transaction channel.

Additionally, resource providers benefit from transaction dispute reduction as well as the ability to avoid paying for disputes to be processed. Since users have access to digital receipts or additional transaction information, they will be better able to identify fraudulent or legitimate transactions. In this way the number of false positives, or cases where users identify a legitimate transaction as a fraudulent one will decrease. This will in turn reduce the number of disputes over unrecognized transactions. Furthermore, resource providers are charged by their acquirers to process disputes, even if the resource provider was willing to settle the dispute without that processing. When disputes are sent directly to acquirers, resource providers are billed for that dispute without being provided the ability to opt out. This often leads to resource providers reimbursing the customer and paying the processing fees, which is disadvantageous to the system described herein, in which the resource provider is given the capability to prevent the dispute from reaching the acquirer.

Authorizing entities also benefit from the method and system according to embodiments of the invention. Authorizing entities benefit from an enhanced user experience. Authorizing entities also benefit from reduced numbers of customer service calls and transaction disputes.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

establishing, by a processing server with an authorization provider, a first application programming interface (API) for direct and secure communication between the processing server and the authorization provider;

receiving, by the processing server from the authorization provider over the first API, a first API call including a dispute request initiated on a client computing device pertaining to a conducted transaction, the dispute request including a transaction identifier associated with the conducted transaction, wherein the client computing device is associated with a legitimate user of an account used in the conducted transaction;

determining, by the processing server, a resource provider associated with the conducted transaction based on at least the transaction identifier;

preventing, by the processing server, the dispute request from being forwarded to an acquirer associated with the resource provider for at least a predetermined period of time;

providing, by the processing server to the resource provider via a direct communication link between the processing server and the resource provider, an alert notification indicating the dispute request, the alert notification including at least the transaction identifier, wherein the providing includes:

establishing, by the processing server, a second application programming interface (API) between the processing server and the resource provider, wherein the second API supports the direct communication link between the processing server and the resource provider without getting routed through the acquirer;

transmitting, by the processing server, the alert notification via a second API call over the second API to the resource provider, wherein the second API call is a direct communication between the processing server and the resource provider, without getting routed through the acquirer;

receiving, by the processing server from the resource provider over the second API, information about an authentication method performed by the resource provider in connection with the conducted transaction, the information comprising a copy of an obtained signature during the conducted transaction as part of the authentication method performed by the resource provider;

obtaining, by the processing server from the authorization provider, an electronic version of a signature of the legitimate user;

comparing, by the processing server, the electronic version of the signature to the obtained signature during the conducted transaction received from the resource provider;

calculating, by the processing server, a likelihood of success for the resource provider in the dispute request based on at least the comparing and historical data for similar disputes; and providing, by the processing server to the resource provider, the likelihood of success;

upon receiving, by the processing server from the resource provider within the predetermined period of time, a credit notification:

monitoring settlement notices for a credit corresponding to the credit notification during a monitoring period; and upon detecting the credit corresponding to the credit notification within the monitoring period, providing a response to the authorization provider indicating the credit thereby resolving the dispute request without going through the acquirer; and releasing the dispute request to the acquirer associated with the resource provider upon determining at least one of:

failing to receive, by the processing server from the resource provider within the predetermined period of time, the credit notification, or failing to detect, by the processing server, the credit corresponding to the credit notification within the monitoring period.

2. The method of claim 1, wherein the credit is determined to correspond to the credit notification via the transaction identifier.

3. The method of claim 1, further comprising:

upon detecting the credit corresponding to the credit notification:

receiving, by the processing server, a second dispute request that includes the transaction identifier; and automatically rejecting the second dispute request.

4. The method of claim 1, wherein if the processing server receives a do not credit response from the resource provider within the predetermined period of time, the dispute request is released to the acquirer associated with the resource provider before the predetermined period of time expires.

5. A processing server comprising:

a processor; and a memory including instructions that, when executed with the processor, cause the processing server to, at least:

establish, with an authorization provider, a first application programming interface (API) for direct and secure communication between the processing server and the authorization provider;

receive, from the authorization provider over the first API, a first API call including a dispute request initiated on a client computing device pertaining to a conducted transaction, the dispute request including a transaction identifier associated with the conducted transaction based on at least the transaction identifier, wherein the client computing device is associated with a legitimate user of an account used in the conducted transaction;

determine a resource provider associated with the conducted transaction;

prevent the dispute request from being forwarded to an acquirer associated with the resource provider for at least a predetermined period of time;

provide, to the resource provider via a direct communication link between the processing server and the resource provider, an alert notification indicating the dispute request, the alert notification including at least the transaction identifier, wherein providing includes:

establishing a second application programming interface (API) between the processing server and the resource provider, wherein the second API supports the direct communication link between the processing server and the resource provider without getting routed through the acquirer;

transmitting the alert notification via an second application programming interface call to the resource provider over the second API, wherein the second API call is a direct communication between the processing server and the resource provider, without getting routed through the acquirer;

receiving, from the resource provider over the second API, information about an authentication method performed by the resource provider in connection with the conducted transaction, the information comprising a copy of an obtained signature during the conducted transaction as part of the authentication method performed by the resource provider;

obtaining, from the authorization provider, an electronic version of a signature of the legitimate user;

comparing the electronic version of the signature to the obtained signature during the conducted transaction received from the resource provider;

calculating a likelihood of success for the resource provider in the dispute request based on at least the comparing and historical data for similar disputes; and providing, to the resource provider, the likelihood of success;

upon receiving, from the resource provider within the predetermined period of time, a credit notification for the conducted transaction:

monitor settlement notices for a credit corresponding to the credit notification during a monitoring period; and upon detecting the credit corresponding to the credit notification during the monitoring period, provide a response to an authorization provider indicating the credit thereby resolving the dispute request without going through the acquirer; and release the dispute request to the acquirer associated with the resource provider upon determining at least one of:

failing to receive, from the resource provider within the predetermined period of time, the credit notification, or failing to detect the credit corresponding to the credit notification within the monitoring period.

6. The processing server of claim 5, wherein the likelihood of success representing a probability that the resource provider will prevail in the dispute request.

\* \* \* \* \*